US007840129B2

(12) United States Patent
Tanaka

(10) Patent No.: US 7,840,129 B2
(45) Date of Patent: Nov. 23, 2010

(54) IMAGING APPARATUS

(75) Inventor: Yoshiharu Tanaka, Osaka (JP)

(73) Assignee: Sony Corporation, Tokyo (JP)

( * ) Notice: Subject to any disclaimer, the term of this patent is extended or adjusted under 35 U.S.C. 154(b) by 299 days.

(21) Appl. No.: 12/149,868

(22) Filed: May 9, 2008

(65) Prior Publication Data

US 2008/0310833 A1 Dec. 18, 2008

(30) Foreign Application Priority Data

Jun. 14, 2007 (JP) ............................ 2007-157451

(51) Int. Cl.
*G03B 17/00* (2006.01)

(52) U.S. Cl. ......................... 396/55; 396/301; 359/507; 348/208.12

(58) Field of Classification Search ............ 348/208.12, 348/372; 396/55, 301, 303; 359/507
See application file for complete search history.

(56) References Cited

U.S. PATENT DOCUMENTS 4,387,987 A * 6/1983 Koike et al. ................. 355/133
7,680,403 B2 * 3/2010 Okumura et al. .............. 396/55
2003/0214588 A1 * 11/2003 Takizawa et al. ....... 348/207.99
2007/0153385 A1 * 7/2007 Sakai et al. ................. 359/511
2008/0055459 A1 * 3/2008 Ito et al. ...................... 348/335
2009/0257123 A1 * 10/2009 Okazaki et al. ............. 359/513

FOREIGN PATENT DOCUMENTS

JP 2006-078898 3/2006

* cited by examiner

*Primary Examiner*—Melissa J Koval
*Assistant Examiner*—Leon W Rhodes
(74) *Attorney, Agent, or Firm*—Radar, Fishman & Grauer PLLC

(57) ABSTRACT

An imaging apparatus is disclosed. The apparatus includes: (a) an imaging device subunit having an imaging device for creating an image signal associated with a subject and a light-transmitting member mounted ahead of a photosensitive surface of the imaging device; (b) a first driver circuit for driving a first actuator that moves the imaging device subunit in a first direction; (c) a second driver circuit for driving a second actuator that moves the imaging device subunit in a second direction substantially perpendicular to the first direction; and (d) first dust-removing means for shaking off dust adhering to the light-transmitting member by driving a given actuator so as to vibrate the light-transmitting member; wherein the given actuator is driven using the first driver circuit or the second driver circuit.

6 Claims, 19 Drawing Sheets

IMAGING APPARATUS

CROSS REFERENCE TO RELATED APPLICATION

The present invention contains subject matter related to Japanese Patent Application JP 2007-157451 filed in the Japanese Patent Office on Jun. 14, 2007, the entire contents of which are incorporated herein by reference.

BACKGROUND OF THE INVENTION

1. Field of the Invention

The present invention relates to an imaging apparatus capable of permitting an imaging device subunit having an imaging device therein to be moved in a given direction.

2. Description of the Related Art

Some imaging apparatuses designed as digital cameras are equipped with a shake correction mechanism that shifts the position of an imaging device subunit having an imaging device and a low-pass filter (optical filter) therein to achieve anti-jitter stabilization during shooting (see, for example, JP-A-2006-78898 (patent reference 1)).

Meanwhile, in an imaging apparatus, such as a digital single-lens reflex camera, dust may intrude into the body of the camera and adhere to the surface of the low-pass filter during exchange of the lens. In this case, the dust adhering to the low-pass filter may undesirably appear in the final image, thus deteriorating the quality of the image.

One known countermeasure against such adhesion of dust is to apply a conductive paint onto the surface of the low-pass filter, or to coat the surface with fluororesin. A further known countermeasure is to activate the above-described shake correction mechanism so that the imaging device subunit is reciprocated, thus shaking off the dust adhering to the low-pass filter.

Another available method to remove dust is to vibrate the low-pass filter in the direction of the thickness (vertical to the main face) by an actuator (such as a piezoelectric device) so that dust adhering to the surface of the low-pass filter is shaken off. This method makes it possible to remove dust more effectively than the above-described method using the shake correction mechanism.

SUMMARY OF THE INVENTION

However, in the method of removing dust by vibrating the low-pass filter made of a light-transmitting member by means of the actuator, a driver circuit for driving the actuator is required. Hence, the driver circuit portion increases the cost accordingly.

Thus, it is desirable to provide an imaging apparatus capable of permitting a light-transmitting member mounted to an imaging device subunit to effectively remove the adhering dust at low cost.

One embodiment of the present invention provides an imaging apparatus having: (a) an imaging device subunit having an imaging device for creating an image signal associated with a subject and a light-transmitting member mounted ahead of a photosensitive surface of the imaging device; (b) a first driver circuit for driving a first actuator that moves the imaging device subunit in the first direction; (c) a second driver circuit for driving a second actuator that moves the imaging device subunit in the second direction substantially perpendicular to the first direction; and (d) a first dust-removing device for shaking off dust adhering to the light-transmitting member by driving a given actuator so as to vibrate the light-transmitting member. The given actuator is driven using the first driver circuit or the second driver circuit.

According to this embodiment of the invention, when dust adhering to the light-transmitting member is shaken off by driving the given actuator to vibrate the light-transmitting member of the imaging device subunit, the given actuator is driven using either the first driver circuit for driving the first actuator for moving the imaging device subunit in the first direction, or the second driver circuit for driving the second actuator that moves the imaging device subunit in the second direction (substantially perpendicular to the first direction). As a result, the dust adhering to the light-transmitting member can be removed effectively at a low cost.

DESCRIPTION OF THE PREFERRED EMBODIMENTS

First Embodiment

<Outside Appearance of Imaging Apparatus>

Figure 1:
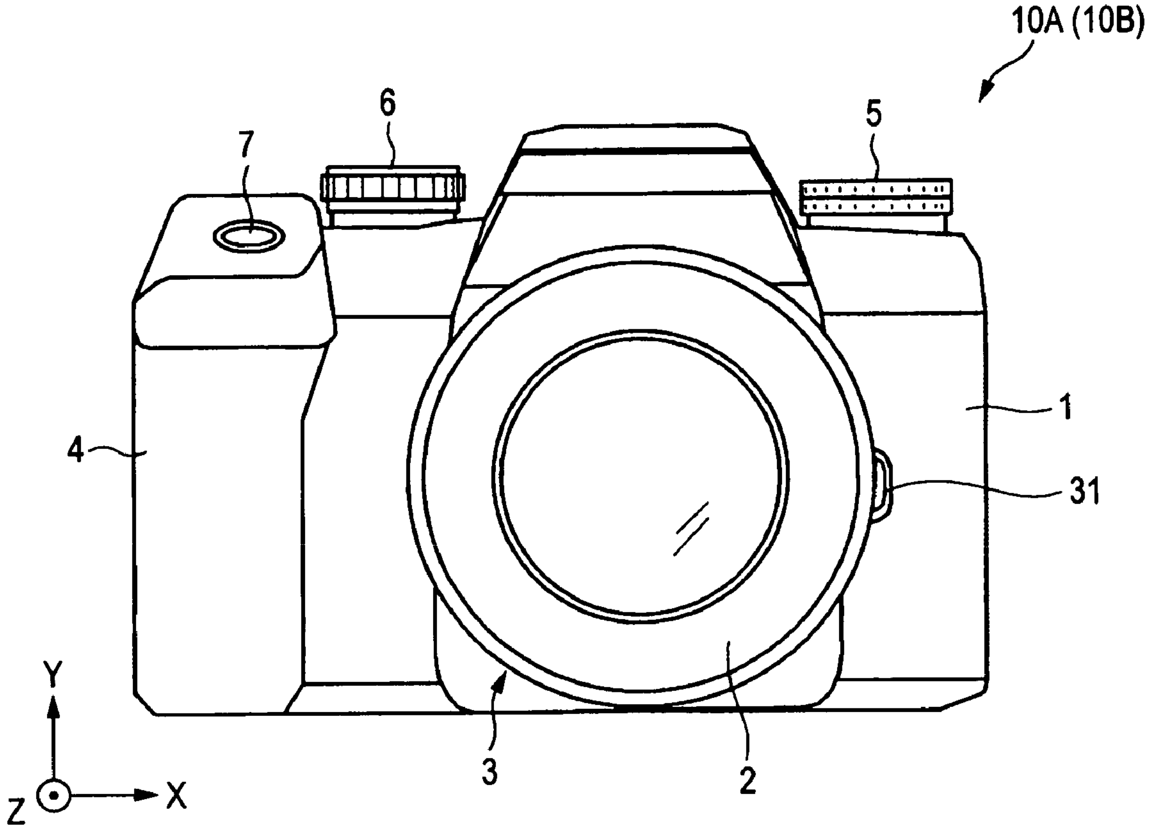
FIG. 1 is a front elevation of an imaging apparatus 10A associated with a first embodiment of the present invention, showing the outside appearance of the apparatus.
Figure 2:
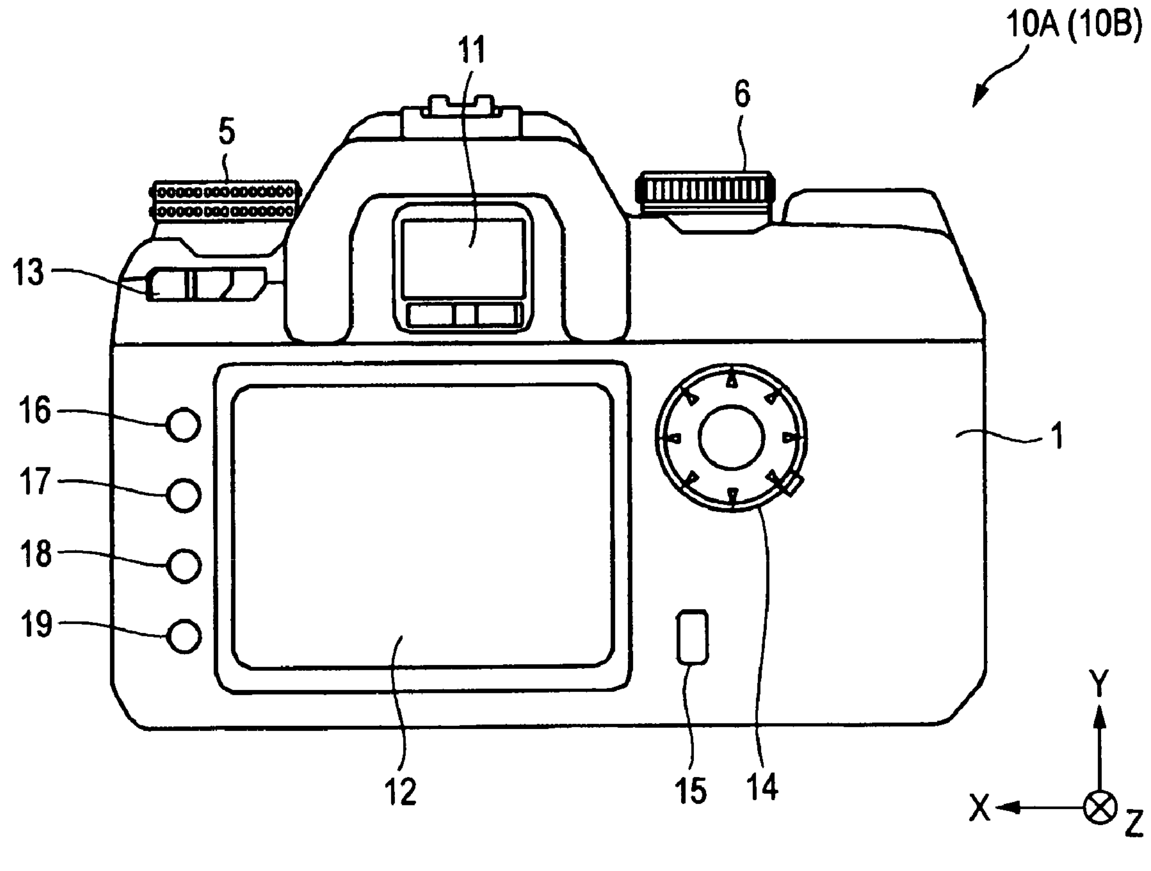
FIG. 2 is a view of the imaging apparatus 10A, showing the outside appearance of the apparatus.

FIGS. 1 and 2 show the outside appearance of an imaging apparatus 10A associated with a first embodiment of the present invention. FIG. 1 shows the outside appearance of the front side of the imaging apparatus 10A. FIG. 2 shows the outside appearance of the rear side of the imaging apparatus 10A. As shown in FIG. 1, the imaging apparatus 10A is configured as a digital single-reflex still camera including a camera body 1 and a lens assembly 2 (replaceable lens) detachably mounted to a substantially front central portion of the camera body 1.

In FIG. 1, the camera body 1 has a lens mount 3 in a front and almost central portion of the body, a grip portion 4 protruding from the front left end of the body, a control value-setting dial 5 mounted in the front, right, upper part of the body for setting a control value, a mode-setting dial 6 mounted on the front, left, upper part of the body to permit the user to switch the shooting mode, and a shutter release button 7 mounted in the top surface of the grip portion 4 for giving instructions for start or end of a shooting operation or exposure. The lens assembly 2 is mounted in the lens mount 3. The grip portion 4 permits the user to grip the camera body with one or both hands with certainty.

The lens assembly 2 functions as a lens window for accepting light (an optical image) from the subject and forms a shooting lens system for guiding the light to an imaging device 101 (described later), and to a viewfinder 102 disposed inside the camera body 1. For example, the shooting lens system includes a zoom lens block and a fixed lens block arranged in series along the optical axis. The lens assembly 2 is configured to permit manual operations and adjustment of the focus, made by automatically moving the lens into various positions.

An attach/detach button 31 mounted near the lens mount 3, permits the lens assembly 2 to be mounted and dismounted. Plural electrical contacts (not shown) for making an electrical contact with the mounted lens assembly 2 and plural couplers (not shown) for making a mechanical connection are also mounted near the mount 3. The electrical contacts are used to deliver information, such as the full aperture F value and focal distance, intrinsic to the lens assembly 2 from the lens ROM (read only memory) incorporated in the lens assembly 2 to an overall controller 100 (see FIG. 13) located within the camera body 1. The electrical contacts also deliver information about the position of the focus lens within the lens assembly 2 and information about the position of the zoom lens to the overall controller 100. The couplers are used to transmit the driving force of a focus lens-driving motor to various lenses within the lens assembly 2, the motor being mounted in the camera body 1.

The mode-setting dial 6 is used to set various shooting modes including automatic exposure (AE) control mode, automatic focus (AF) control mode, still image shooting mode for taking still images, motion picture shooting mode (continuous shooting mode) for taking a motion picture sequence, and flash mode.

The release button 7 is a depression switch permitting both a half depressed state and a fully depressed state. In the still image shooting mode, if the release button 7 is half depressed, preparatory operations (such as setting of exposure control value and adjustment of the focus) for shooting still images of the subject are performed. If the release button 7 is fully depressed, shooting operations are carried out, including operations of exposing the imaging device (described later), causing an image signal obtained by the exposure to be processed in a given manner, and recording the resulting data on a memory card. In the motion picture shooting mode, if the release button 7 is fully depressed, shooting operations are started, including operations of exposure of the imaging device similar to the foregoing exposure, processing the resulting image signal, and recording of the processed image data onto a memory card. If the release button 7 is again fully depressed, the shooting operations are terminated.

In FIG. 2, a finder window 11 is formed in a substantially central top portion of the rear surface of the camera body 1. An image from the subject is guided to the finder window 11 through the lens assembly 2. The user (photographer) can visually check the subject by peeping through the finder window 11. An external display portion 12 made of an LCD is mounted around the center of the rear surface of the camera body 1. In the present embodiment, the external display portion 12 is made of a color liquid-crystal display, for example, having 400 (X-direction)×300 (Y-direction)=120,000 pixels. The above-described motion picture sequence is displayed on the external display portion. Modes regarding AE control and AF control and modes regarding shot scenes are displayed on the external display portion. Furthermore, a menu screen for setting shooting conditions can be displayed on the external display portion. In playback mode, shot images recorded on the memory card are reproduced on the external display portion.

A power switch 13 is mounted on a left upper part of the external display portion 12, and is made, for example, of a two-point slide switch. When its contact is switched to the left "OFF" position, the power supply is turned off. When its contact is switched to the right "ON" position, the power supply is turned on. Direction keys 14 and a camera shake correction switch 15 are mounted on the right side of the external display portion 12. The direction keys 14 have a circular control button. Four directional (i.e., up, down, left, and right) depressing operations on the control button, and further four diagonal directional (i.e., rightwardly upward, leftwardly upward, rightwardly downward, and leftwardly downward) depressing operations on the control buttons are detected. The direction keys 14 are multi-functionalized and acts as control switches for modifying the item selected from a menu screen for setting a shot scene displayed, for example, on the external display portion 12. Furthermore, the direction keys 14 acts as control switches for modifying the frame of image which is selected from an index window and to be reproduced. Plural thumbnail images can be arrayed in the index window. In addition, the direction keys 14 can be operated as a zoom switch for modifying the focal distance of the zoom lens of the lens assembly 2.

The camera shake correction switch 15 is used to set a shake correction mode, permitting reliable shooting in cases where "shake", caused by hand motions, may take place during shooting when the camera body is held in hand telephotography, or in photographs with dark portions where a long time of exposure is needed. The camera shake correction switch 15 may be a two-point slide switch similarly to the power switch 13.

Switches for performing operations regarding display provided on the external display portion 12 and the contents of the display are mounted on the left side of the external display portion 12. These switches include a cancellation switch 16, a set switch 17, a menu display switch 18, and an external display selector switch 19. The cancellation switch 16 is used to cancel the contents selected from a menu screen. The set switch 17 is used to set the contents selected from the menu screen. The menu display switch 18 is used to display a menu screen on the external display portion 12 and to switch the contents of the menu screen (e.g., a shot scene-setting window or a mode-setting window regarding exposure control). Whenever the menu display switch 18 is depressed, the menu screen is switched. The external display selector switch 19 is used to turn on or off the display provided on the external display portion 12. Whenever the external display selector switch 19 is depressed, the display on the external display portion 12 is alternately activated and deactivated. Various switches, such as push switches (e.g., a zoom switch, an exposure-correcting switch, and an AE lock switch) and dial switches other than the above-described switches, may be mounted in appropriate locations on the camera body 1.

The internal structure of the imaging apparatus 10A having the outside appearance as described so far is described next.

<Internal Structure of Imaging Apparatus 10A>

Figure 3:
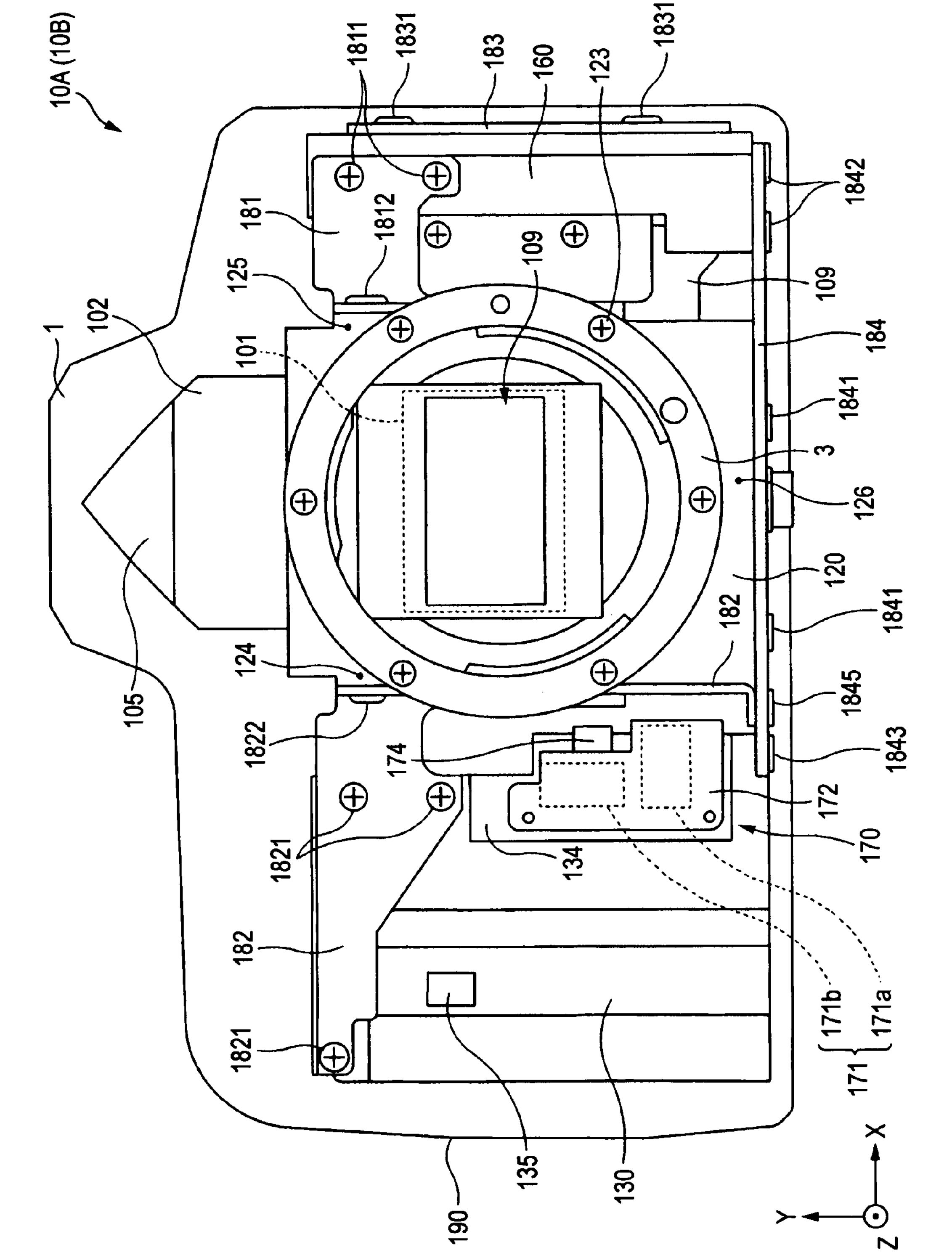
FIG. 3 is a front elevational opened-up view of the imaging apparatus 10A.
Figure 4:
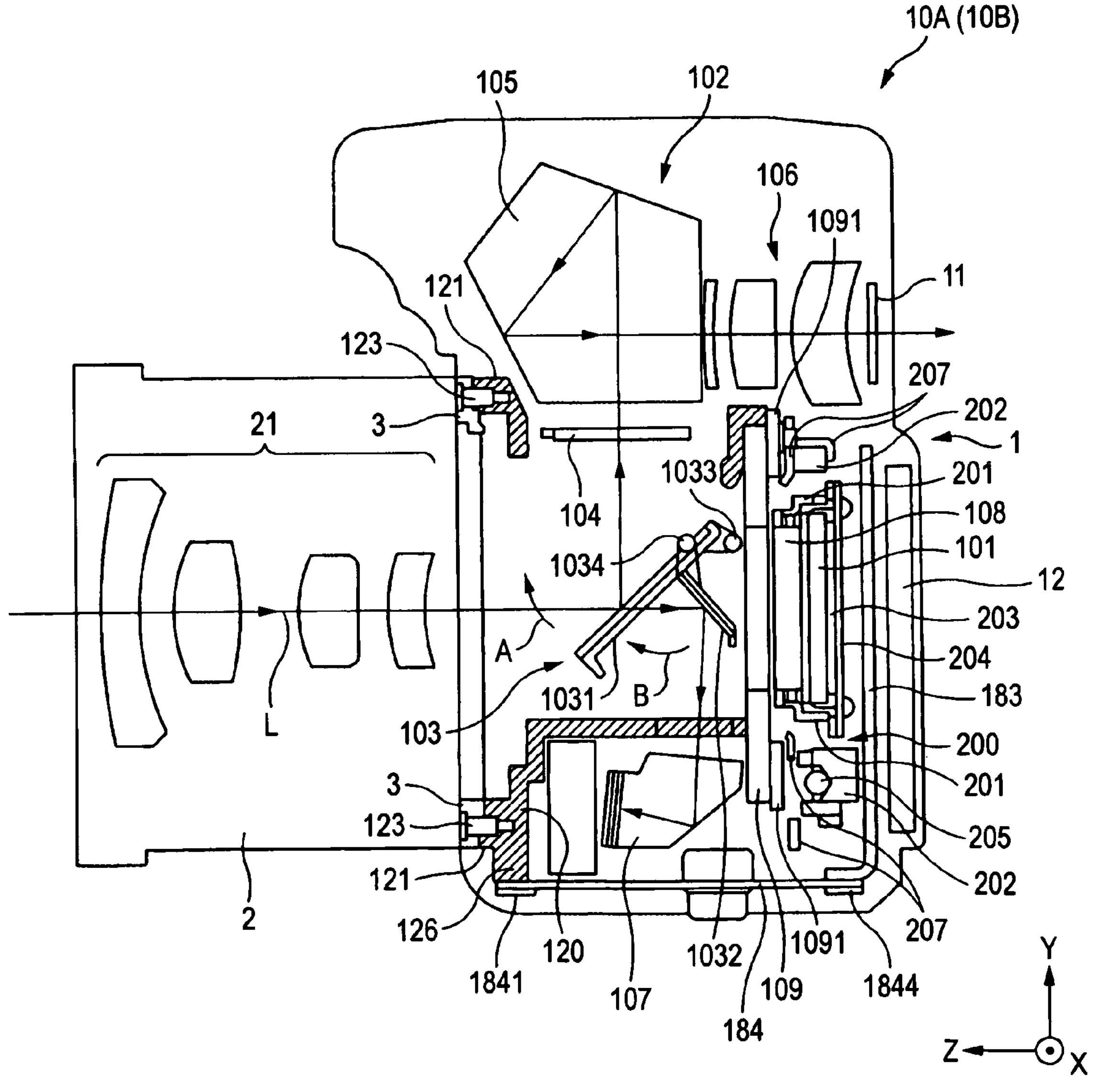
FIG. 4 is a side elevation in cross section of the imaging apparatus 10A.
Figure 5:
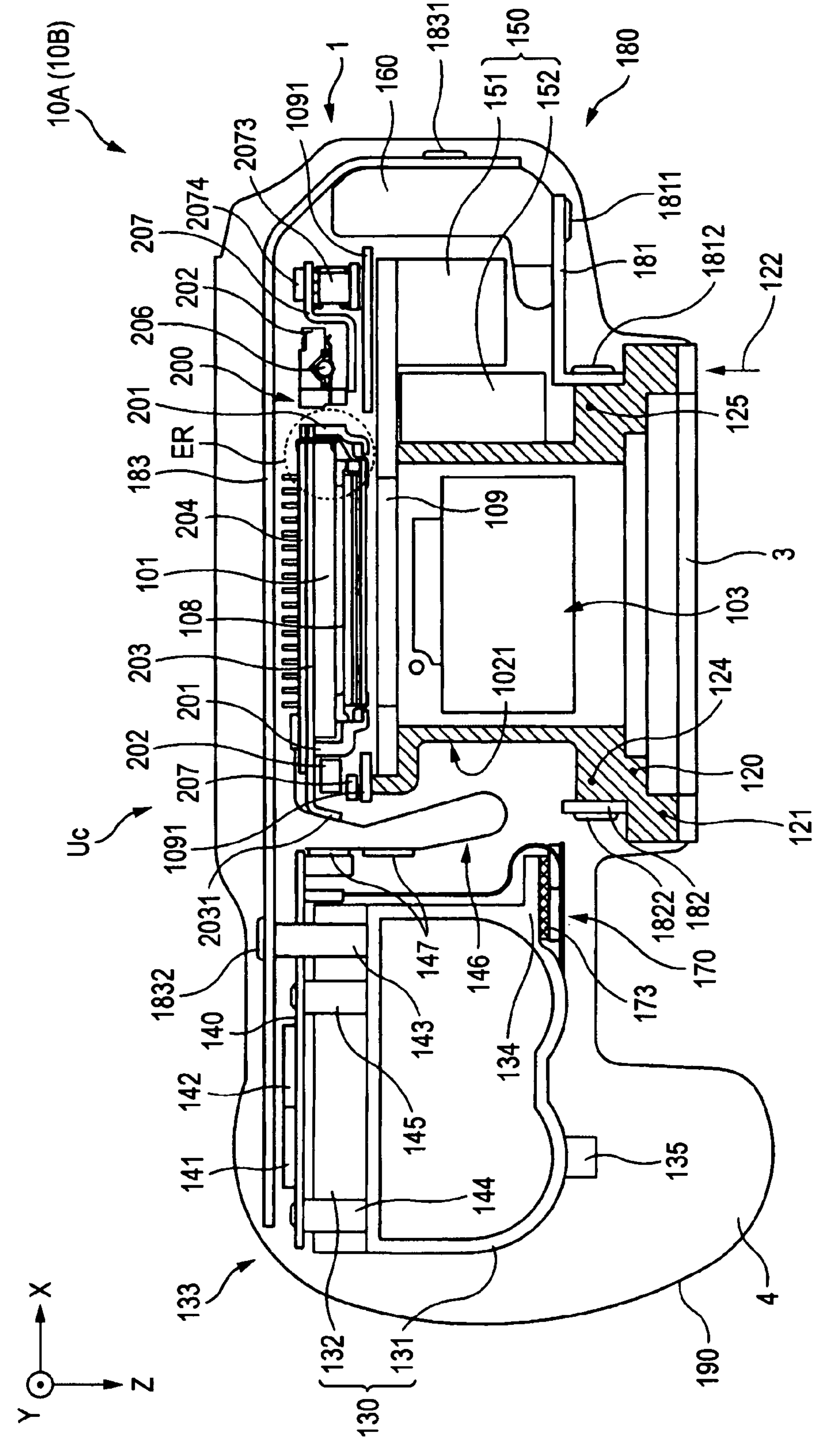
FIG. 5 is a top view in cross section of the imaging apparatus 10A.

FIG. 3 is a front elevational opened-up view of the imaging apparatus 10A. FIG. 4 is a side elevation in cross section of the imaging apparatus 10A. FIG. 5 is a top view in cross section of the imaging apparatus 10A. FIGS. 3 and 5 are an opened-up view and a cross-sectional view, respectively, showing the state of the imaging apparatus in which the lens assembly 2 has been removed. As shown in FIGS. 3 and 5, the lens assembly 2 has lenses 21, and a rectangular imaging device 101 is disposed perpendicularly to the optical axis L (see FIG. 4) of the lenses 21 in the lens assembly 2 when it has been mounted to the camera body 1.

The imaging device 101 detects the luminance of the subject (i.e., images the light coming from the subject). That is, the imaging device converts the amount of light of the optical image arising from the subject and focused by the lens assembly 2 into electrical image signals of R, G, and B components, and outputs the signals to a control substrate 140 (image processing circuit 141) (described later). In particular, for example, the imaging device 101 has plural pixels, each having photodiodes. The pixels are arranged in a two dimensional matrix. A Bayer array color area sensor is used as the imaging device. Color filters having different spectral characteristics, such as of red (R), green (G), and blue (B), are disposed in a ratio of 1:2:1 on the photo-sensitive surface of each pixel on the color area sensor. The imaging device (imaging sensor) 101 converts the optical image of the subject, focused by the lenses 21 in the lens assembly 2, into electrical analog image signals of R, G, and B, and creates image signals of R, G, and B. A CCD image sensor, CMOS image sensor, VMIS image sensor, and other sensors can be used as the imaging device 101. In the present embodiment, a CCD image sensor is used.

On the optical axis L shown in FIG. 4, a mirror assembly 103 is disposed at a position where the light from the subject is reflected toward the viewfinder (finder optics) 102. The subject light transmitted through the lens assembly 2 is reflected upward by the mirror assembly 103 (especially, a main mirror 1031 (described later)) and focused onto a focusing glass 104. On the other hand, a part of the subject light transmitted through the lens assembly 2 passes through the mirror assembly 103.

The viewfinder 102 has a pentaprism 105, an eyepiece 106, and the aforementioned finder window 11. The pentaprism 105 has a pentagonal cross section and creates an erect image of the optical image of the subject incident from the lower surface by inverting the image vertically and laterally by internal reflections. The subject image converted into the erect image by the pentaprism 105 is guided to the outside of the finder window 11 by the eyepiece 106. Because of this structure, the viewfinder 102 acts as an optical finder for checking the subject in shooting standby mode.

The mirror assembly 103 is made up of the above-described main mirror 1031 and a sub mirror 1032. On the rear side of the main mirror 1031, the sub mirror 1032 is rotatably mounted so as to be tilted toward the rear surface of the main mirror 1031. A part of the subject light transmitted through the main mirror 1031 is reflected by the sub mirror 1032 into a focus detection portion 107. The focus detection portion 107 is made of a range-finding device for detecting information about the focus of the subject and acts as a so-called AF sensor.

The mirror assembly 103 is built as a so-called quick-return mirror. During exposure, the mirror assembly is rotated about its axis of rotation 1033 and popped upward as indicated by the arrow A. Then, the mirror assembly comes to a stop at a position lying below the focusing glass 104. At this time, the sub mirror 1032 rotates about its axis of rotation 1034 in the direction indicated by the arrow B with respect to the rear surface of the main mirror 1031. When the mirror assembly 103 comes to a stop at a position lying below the focusing glass 104, the sub mirror is folded back substantially parallel to the main mirror 1031. Consequently, the subject light from the lens assembly 2 reaches the imaging device 101 without being blocked by the mirror assembly 103, whereby the imaging device 101 is exposed. When the exposure is terminated, the mirror assembly 103 returns to its original position, shown in FIG. 4.

A low-pass filter 108 made of an optical filter for preventing color artifacts and color moiré is disposed ahead of the exposed surface of the imaging device 101. Furthermore, a shutter portion 109 is disposed ahead of the low-pass filter 108. The shutter portion 109 is controlled to be opened or closed during exposure. For example, a vertically moving focal plane shutter is adopted as the shutter portion 109. The front side of the shutter portion 109 is in abutment with the rear end of a frame body 120 (described later). The rear side of the shutter portion 109 is held between parts of a shutter-holding plate 1091, which in turn is held to the frame body 120 with screws 1092 (see FIG. 6). Consequently, the shutter portion 109 is supported to the frame body 120. The external display portion 12 is disposed at the rear of the imaging device 101 in a parallel relation to the surface of the imaging device 101, such that a side chassis 183 (described later) is located between the surface of the imaging device 101 and the external display portion 12.

The imaging device 101 cooperates with a slider 202 and actuators (described later) to form a shake correction unit 200 for sliding the imaging device 101 up and down and right and left to make compensations for camera shake by driving the actuators, based on shake information detected by a gyro unit 170 (described later). The actuators include a yaw-direction actuator 205 and a pitch-direction actuator 206. The structure and operation of the shake correction unit 200 are described in detail later.

In FIG. 3, the frame body (front frame) 120 is disposed in a substantially central portion of the camera body 1 in the rear of the lens mount 3 (see the hatched portions of FIGS. 4 and 5). The frame body 120 is a cylindrical body with a rectangular cross section. The frame body 120 assumes a substantially square form as viewed from the front, with openings in the front and rear surfaces of the frame body 120. Also, the top surface of the frame body 120 opposite to the pentaprism 105

(focusing glass 104) has an opening. The frame body 120 is made of a metallic rigid body, showing improved strength against distortions. A mount-receiving portion 121 made cylindrical in conformity with the shape of the lens mount 3 is formed on the front surface of the front frame 120. The lens mount 3 is fitted in the mount-receiving portion 121. Under this condition, the front frame is held with plural screws 123 from the front side indicated by the arrow (see FIG. 5) of symbol 122. The mirror assembly 103 is disposed inside the frame body 120 and acts also as a member for holding the mirror assembly 103.

A battery chamber 131 is disposed on the left side of the frame body 120 and inside the grip portion 4. The battery chamber 131 is made, for example, of a resin. A given number of size AA batteries are accommodated in the battery chamber and act as a power supply for activating the imaging apparatus 10A. A card-receiving portion 132 is formed behind the battery chamber 131. A removable recording medium, such as a memory card for recording image data about shot images, is received in the card-receiving portion 132. The memory card is received from the card slot cover 133 mounted at a side of the grip portion 4 when it is opened. The battery chamber 131 and card-receiving portion 132 together form a structural body, which will be referred to as the battery unit 130.

The control substrate 140 is disposed on the rear surface of the card-receiving portion 132 of the battery unit 130. Electronic parts including the image-processing circuit 141 (such as ASIC for image processing) for performing given signal processing on image data and a shake correction circuit 142 (such as an ASIC for shake correction) for controlling an operation for shake correction (described later) are mounted on the control substrate 140. This control substrate 140 constitutes an overall controller 100 (described later). The control substrate 140 is located adjacent to the shake correction unit 200 substantially within the same plane. The battery unit 130 has a connector portion 143 held to the side chassis 183 (described later). The control substrate is mounted on the battery unit 130 with screws 144 and 145. The control substrate 140 and imaging device 101 are electrically connected together by a flexible printed wiring board 146.

A drive unit 150 for driving the mirror assembly 103 and shutter portion 109 is disposed adjacent to the right side of the front frame 120. The drive unit 150 includes a shutter driver portion 151 for opening and closing the shutter portion 109 and a mirror driver portion 152 for driving the mirror assembly 103. The shutter driver portion for driving the shutter portion is partially incorporated in the mirror driver portion 152. The connector portion 160 is made of a resin is disposed further on the right side (outer side) of the drive unit 150. The connector portion 160 is a structural body having AC power jacks and holders for remote terminals and USB terminals.

The aforementioned gyro unit 170 is mounted in the side wall of the battery unit 130 that is located ahead of the battery chamber 131. The gyro unit 170 includes a gyro portion 171, a gyro substrate 172, a damper material 173, and a flexible printed wiring board 174 for the gyro portion. The gyro unit acts to detect shake information such as information about the direction and amount of shake of the imaging apparatus 10A. The shake information detected by the gyro unit 170 is used for control when an operation for camera shake correction is performed by the shake correction unit 200. The gyro portion 171 has a yaw-direction gyro 171*b* for detecting the amount of shake based on the angular velocity of shake of the imaging apparatus 10A in the yaw direction and a pitch-direction gyro 171*a* for detecting the amount of the shake in the pitch direction, based on the angular velocity of the shake. Each of these gyros can be made of a gyro type that detects an angular velocity by applying a voltage, for example, to a piezoelectric device to vibrate it and extracting the distortion as an electrical signal. The distortion is caused by a Coriolis force produced when the angular velocity is applied to the piezoelectric device due to a rotational motion. The gyro portion 171 is mounted on the gyro substrate 172. The gyro substrate 172 is mounted to a gyro mount portion 134 formed on a side wall of the battery unit 130 via the damper material 173, the gyro mount portion 134 assuming the form of a flat plate.

The damper material 173 prevents vibrations produced by operation of the mirror assembly 103 from being transmitted to the gyro portion 171; otherwise, the gyro portion 171 would result in error detection. For example, a sheet member having a layer of a rubber material (such as butyl rubber) and adhesive layers on both sides of the rubber material layer can be used. The gyro flexible printed wiring board 174 electrically connects the gyro portion 171 (including the yaw-direction gyro 171*b* and pitch-direction gyro 171*a*) with the control substrate 140.

A posture sensor 135 for detecting the posture of the imaging apparatus 10A is mounted ahead of the battery chamber 131 of the battery unit 130. For example, the posture sensor 135 is made of a mercury switch, a gravity sensor, an acceleration sensor, or the like. It is possible to detect whether the imaging apparatus 10A is in a lateral posture or in a vertical posture, based on the result of the detection performed by the posture sensor 135. Furthermore, a gravity direction-sensing portion 313A (see FIG. 13) (described later) can detect the direction of gravity (vertically downward direction). Preferably, the posture sensor 135 is designed to be capable of at least judging which of the four directions (up, down, left, and right) of the imaging apparatus 10A is the direction of gravity.

The various parts of the imaging apparatus 10A are coupled together by a chassis portion 180 made of a metal material such as iron. In the imaging apparatus 10A, the chassis 180 is made up of front chassis portions 181, 182, side chassis portion (back chassis portion) 183, and a bottom chassis portion 184 forming a bottom plate.

<Shake Correction Unit 200>

Figure 6:
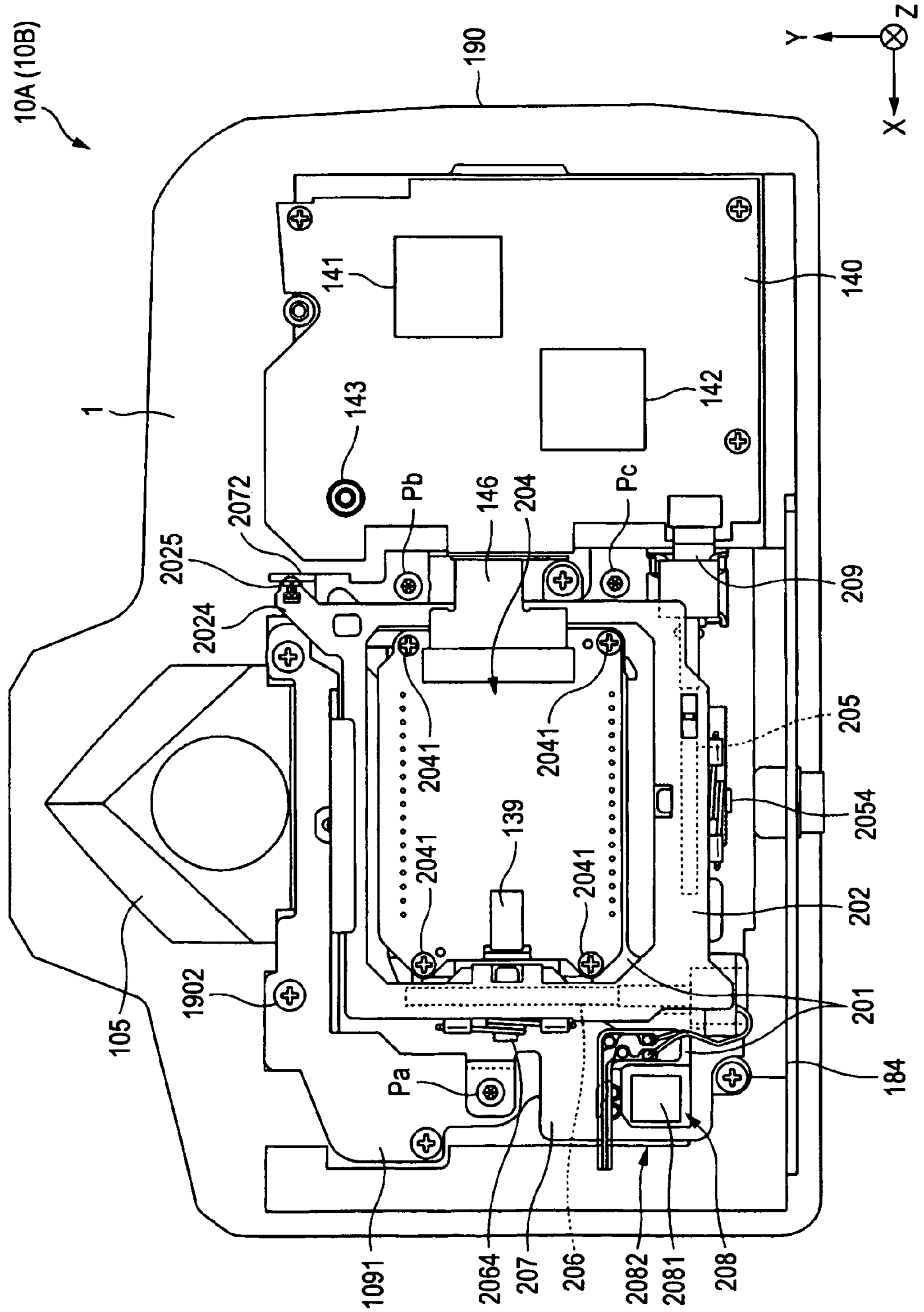
FIG. 6 is an opened-up view of the imaging apparatus 10A,(10B) in which a side chassis 183 has been removed.
Figure 7:
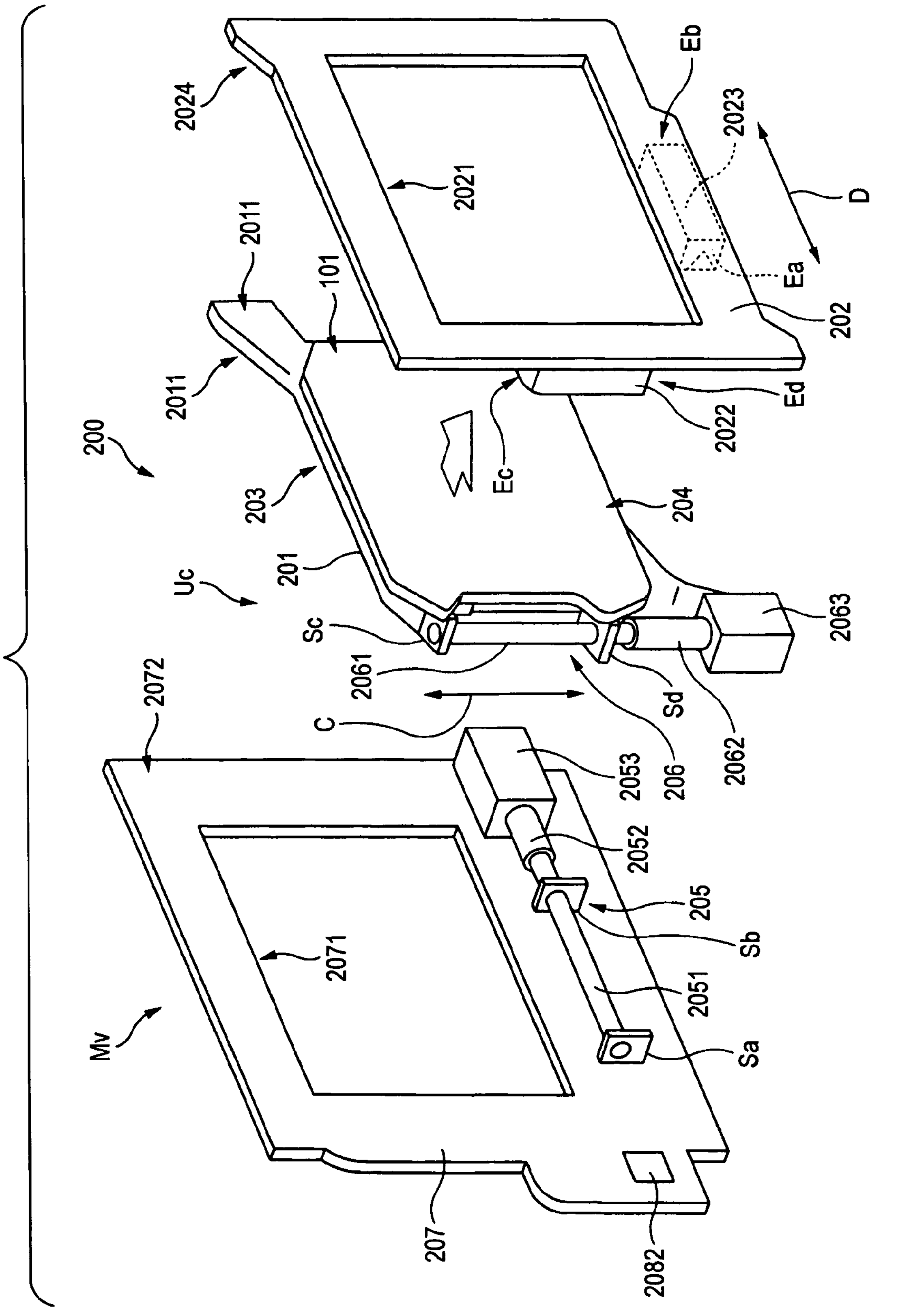
FIG. 7 is a schematic exploded perspective view of a shake correction unit 200, showing its configuration.

The shake correction unit 200 is next described in detail by referring to FIGS. 6 and 7, as well as to FIGS. 4 and 5. In FIG. 6, the side chassis portion 183 has been removed. FIG. 7 is a schematic perspective view of the shake correction unit 200, showing its structure.

The shake correction unit 200 includes an imaging device subunit Uc, the slider 202 holding the imaging device subunit Uc, the yaw-direction actuator 205, the pitch-direction actuator 206, a swinging pedestal 207, and a position sensor portion 208. The imaging device subunit Uc has the imaging device 101, the low-pass filter 108, an image device holder 201, a heat-dissipating plate 203 disposed on the rear surface of the imaging device 101, and an imaging device substrate 204 disposed on the rear surface of the heat-dissipating plate 203. The holder 201 holds the imaging device 101 and low-pass filter 108.

The imaging device substrate 204 is a substantially rectangular base plate on which the imaging device 101 is mounted while the heat-dissipating plate 203 is interposed between the imaging device 101 and the imaging device substrate 204. The heat-dissipating plate 203 assumes a form of flat plate and is made of a given metallic material. The heat-dissipating plate 203 acts to dissipate away heat generated photoelectrically when the imaging device 101 is driven. The imaging device holder 201 is a frame having a substantially rectangular cross section whose front and rear sides are open. The low-pass filter 108 is mounted to the front side of the frame. The imaging device 101 is disposed behind the low-pass filter 108. The imaging device substrate 204 is held to the imaging device holder 201 with screws 2041, while the imaging device 101 and the heat-dissipating plate 203 are pressed against the imaging device holder 201 by the imaging device substrate 204.

The pitch-direction actuator 206 is mounted to one side (in this example, the left side) of the imaging device holder 201 in the left and right direction. The imaging device holder 201 is mounted to the slider 202 slidably in the direction of pitch (up and down direction C of FIG. 7) via the pitch-direction actuator 206. The slider 202 is a frame in the form of a substantially flat plate and substantially centrally provided with a rectangular opening 2021 larger than the imaging device substrate 204. A bearing portion 2022 having a V-groove is mounted firmly in a position on the slider 202 opposite to the pitch-direction actuator 206. The pitch-direction actuator 206 (especially, a shaft portion 2061 (described later)) is slidably fitted in the V-groove to permit the sliding motion. Another bearing portion 2023 similar in structure with the bearing portion 2022 corresponding to the yaw-direction actuator 205 is firmly mounted below the slider 202. Biasing forces produced by biasing members 2054 and 2064 (such as springs) holds the shaft portions 2051 and 2061 between the holding plate (for yawing suppression or for pitch-direction suppression) and the bearing portion (2022 or 2023) as shown in FIG. 6 such that the shaft portions 2051 and 2061 are frictionally fitted in the bearing portions 2022 and 2023 as described later.

The swinging pedestal 207 forms the base of the shake correction unit 200 for holding the slider 202 when the imaging device holder 201 is held to it. The pedestal 207 is a frame substantially centrally provided with an opening 2071 approximate in size to the opening 2021 in the slider 202. In practice, the opening 2021 in the slider 202 is slightly larger than the opening 2071. The yaw-direction actuator 205 is firmly affixed to one upper or lower side (in this example, the lower side) of the swinging pedestal 207. The slider 202 is mounted to the swinging pedestal 207 to permit the slider to slide in the yaw direction (in the left and right direction indicated by the arrow D of FIG. 7), while the bearing portion 2023 of the slider 202 is slidably fitted in the yaw-direction actuator 205 (shaft portion 2051 (described later)).

Because of the structure described so far, a drive mechanism Mv capable of moving the imaging device subunit Uc in the up and down direction C (FIG. 7) of the imaging apparatus 10A and in the left and right direction D (FIG. 7) substantially perpendicular to the up and down direction is formed. The yaw-direction actuator 205 forming a first actuator, and the pitch-direction actuator 206 forming a second actuator, permits the imaging device subunit Uc to be moved in the left and right direction D and in the up and down direction C.

A corner 2024 of the slider 202 is biased by a biasing member, such as a spring, toward the right upper corner 2072 of the swinging pedestal 207, pressed against and coupled to the right upper corner 2072. Meanwhile, a ball is loosely fitted in the rear surface 2011 of a corner of the imaging device holder 201 and is held between the rear surface 2011 of the corner of the imaging device holder 201 and the corner 2024 of the slider 202. This permits the slider 202 of the imaging device subunit Uc to slide in the yaw direction and allows the imaging device subunit Uc to slide in the pitch direction. Under this condition, the slider 202 is pressed against the swinging pedestal 207 together with the imaging device subunit Uc. Consequently, it is assured that these components are prevented from disengaging from the swinging pedestal 207.

The swinging pedestal 207 is floated by a screw 2074 via a compression spring 2073 as shown in FIG. 5 at three mounting positions Pa, Pb, and Pc shown in FIG. 6. Under this condition, the swinging pedestal 207 is held to the shutter-holding plate 1091. The tilts of the imaging device 101 relative to the swinging pedestal 207 in the pitch direction and in the yaw direction can be adjusted by adjusting the degree of the tightness of the screw 2074.

The position sensor portion 208 performs an operation for shake correction or detects the position of the imaging device 101 when the operation of the camera is started. The position sensor portion 208 includes a magnet 2081 and a two-dimensional Hall sensor 2082. The magnet 2081 is a device producing lines of magnetic force. The magnetic force at the center is stronger. The magnet 2081 is mounted to a corner of the imaging device holder 201 (see FIG. 6) and moves together with the imaging device subunit Uc. The two-dimensional Hall sensor 2082 includes a given number (e.g., four) of Hall elements arranged in two dimensions, and produces an output signal corresponding to the magnitude of the lines of magnetic force produced from the magnet 2081. The Hall sensor 2082 is mounted and held in a position on the swinging pedestal 207 opposite to the magnet 2081 as shown in FIG. 7. The position sensor portion 208 detects the position of the imaging device 101 by detecting the position of the magnet 2081 by means of the two-dimensional Hall sensor 2082. The magnet 2081 moves as the imaging device holder 201 moves up and down or left and right relative to the swinging pedestal 207. The position sensor portion 208 is electrically connected with the control substrate 140 by a second flexible printed wiring board 209 together with the yaw-direction actuator 205 and pitch-direction actuator 206.

Each of the yaw-direction actuator 205 and pitch-direction actuator 206 is an impact type linear actuator (piezoelectric actuator) that is ultrasonically driven. The yaw-direction actuator 205 has the shaft portion 2051, a piezoelectric device portion 2052, and a weight portion 2053. Similarly, the pitch-direction actuator 206 includes the shaft portion 2061, a piezoelectric device portion 2062, and a weight portion 2063. Each of the shaft portions 2051 and 2061 is a rodlike drive shaft having a given cross-sectional shape (e.g., a circular form), and is vibrationally driven by the piezoelectric device portion 2052 or 2062. The shaft portions 2051 and 2061 are frictionally coupled to the V-grooves in the bearing portions 2023 and 2022, respectively.

Each of the piezoelectric device portions 2052 and 2062 is made of a ceramic material. Each piezoelectric device portion is stretched and contracted according to the applied voltage. The shaft portions 2051 and 2061 are vibrated according to the extension and contraction. In the piezoelectric device portions 2052 and 2062, high-speed extension and low-speed contraction are alternately repeated, or low-speed extension and high-speed contraction are alternately repeated. Alternatively, extension of uniform velocity and contraction of uniform velocity are alternately repeated at the same velocity. Each of the piezoelectric device portions 2052 and 2062 are made of, for example, a laminate piezoelectric device that is firmly mounted to one end of the shaft portion 2051 or 2061 such that the direction of polarization is coincident with the axial direction of the shaft portion 2051 or 2061.

Signal lines from the shake correction circuit 142 on the control substrate 140 are connected with the electrode portions of the piezoelectric device portions 2052 and 2062, respectively. The aforementioned extension and contraction are performed by charging or discharging the piezoelectric device portions 2052 and 2062 according to a drive signal from the control substrate 140. Relative displacement is produced between the bearing portion 2023 or 2022 and the shaft portion 2051 or 2061 because the piezoelectric device portion 2052 or 2062 is repeatedly stretched and contracted in this way. Consequently, the slider 202 is slid back or forth relative to the shaft portion 2051 and brought to a stop in that location. That is, the imaging device subunit Uc slides relative to the slider 202. The weight portions 2053 and 2063 are firmly held to the ends of the shaft portions 2051 and 2061 on the opposite sides of the piezoelectric device portions 2052 and 2062 to permit vibrations produced by the piezoelectric device portions 2052 and 2062 to be transmitted to the shaft portions 2051 and 2061 efficiently.

Stoppers Sa and Sb are mounted near the opposite ends of the shaft portion 2051 to limit movement of the imaging device subunit Uc in the left and right direction D, thus defining its movable range. End surfaces Ea and Eb of the bearing portions 2023 abut against the stoppers Sa and Sb, respectively. This hinders the bearing portion 2023 from moving relative to the shaft portion 2051 beyond the stoppers Sa and Sb. Similarly, stoppers Sc and Sd, each in the form of a rectangular plate, are formed near the opposite ends of the shaft portion 2061 and limit movement of the imaging device subunit Uc in the up and down direction C, thus defining its movable range. The end surfaces Ec and Ed of the bearing portion 2022 abut against the stoppers Sc and Sd, respectively. This hinders the bearing portion 2022 from moving relative to the shaft portion 2061 beyond the stoppers Sc and Sd.

The principle in which the piezoelectric actuator 9, corresponding to the yaw-direction actuator 205 and pitch-direction actuator 206, is driven is described in the following.

Figure 8:
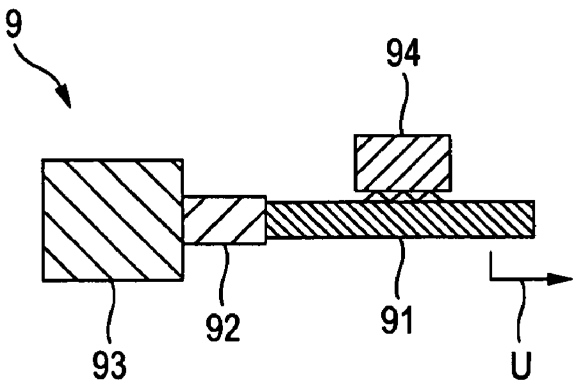
FIG. 8 is a view illustrating the principle on which a piezoelectric actuator 9 is driven.
Figure 9A:
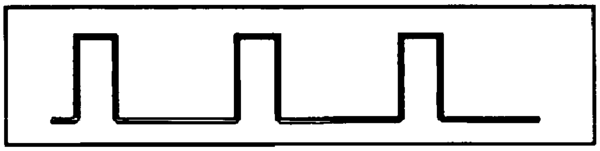
FIGS. 9A to 9C illustrate the operation of the piezoelectric actuator 9.

FIG. 8 is a view illustrating the principle on which the piezoelectric actuator 9 is driven. FIGS. 9-11 are views illustrating the operation of the piezoelectric actuator 9.

The piezoelectric actuator 9 is similar in structure with the yaw-direction actuator 205 and the pitch-direction actuator 206. That is, the piezoelectric actuator 9 has a drive shaft 91 corresponding to the shaft portion 2051, a piezoelectric device portion 92 corresponding to the piezoelectric device portion 2052, a weight portion 93 corresponding to the weight portion 2053, and a movable portion 94 corresponding to the bearing portion 2023. The drive shaft 91 and movable portion 94 are frictionally coupled together.

Figure 9B:
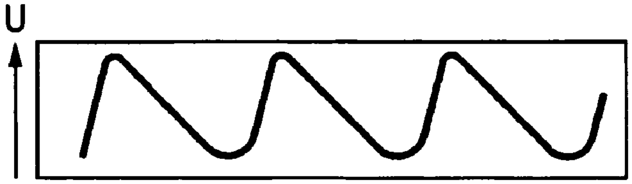
Figure 9C:
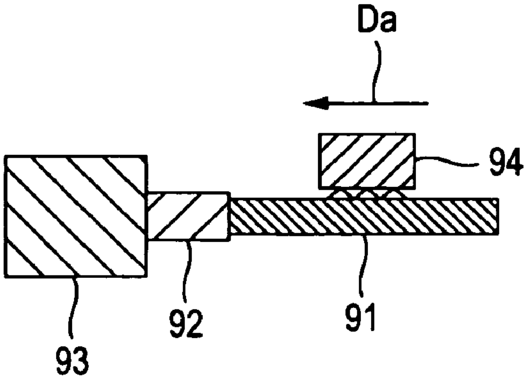
Figure 10A:
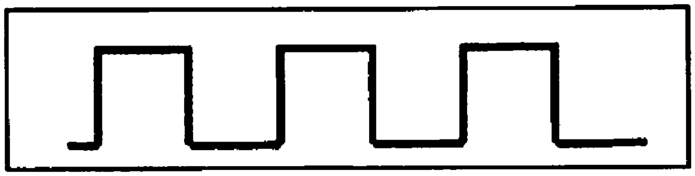
FIGS. 10A to 10C illustrate the operation of the piezoelectric actuator 9.

In the piezoelectric actuator 9 having the structure as described so far, when a voltage of a pulsed waveform (FIG. 9A) having a duty cycle of 33% is applied to the piezoelectric device portion 92, displacement U (FIG. 8) in the direction of elongation of the drive shaft 91 varies as indicated by the waveform shown in FIG. 9B. In consequence, the movable portion 94 moves toward the drive shaft 91 and approaches the piezoelectric device portion 92 in the direction indicated by Da (FIG. 9C).

Figure 10B:
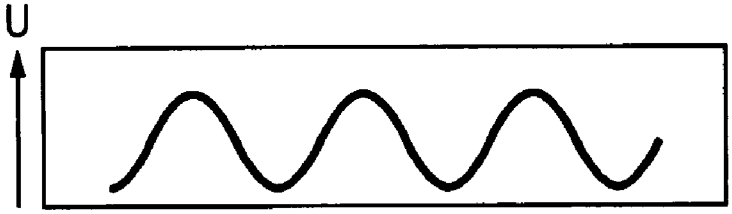
Figure 10C:
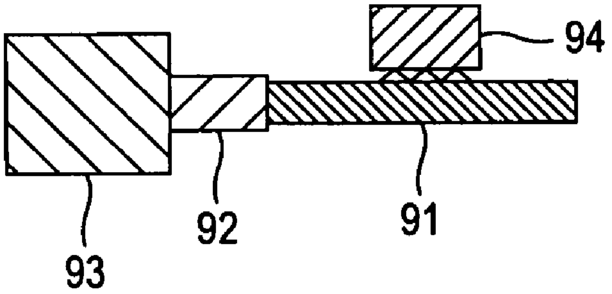
Figure 11A:
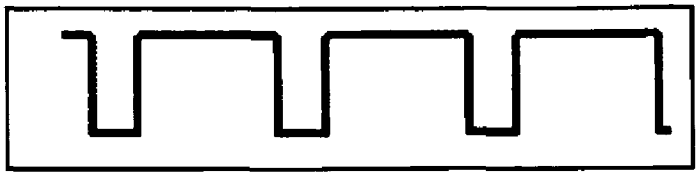
FIGS. 11A to 11C illustrate the operation of the piezoelectric actuator 9.

When a pulsed waveform (FIG. 10B) having a duty cycle of 50% is applied to the piezoelectric device portion 92, the displacement U (FIG. 8) of the drive shaft 91 varies as indicated by the waveform shown in FIG. 10B. In this case, the movable portion 94 does not move relative to the drive shaft 91 (FIG. 10C).

Figure 11B:
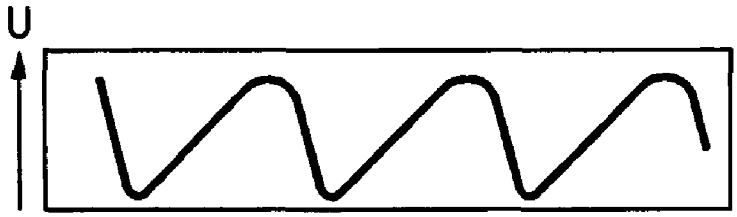
Figure 11C:
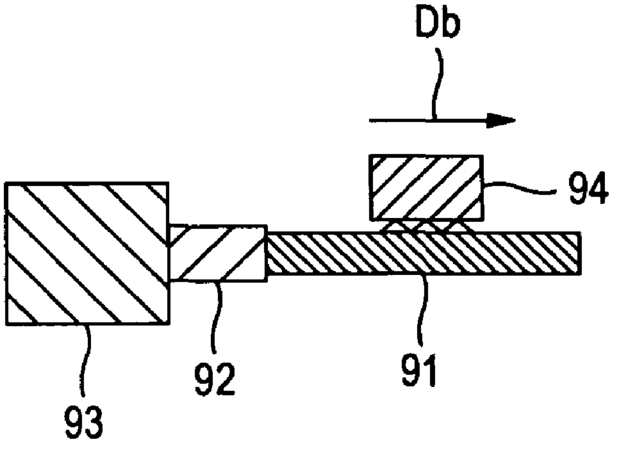

Meanwhile, when a voltage of a pulsed waveform (FIG. 11A) having a duty cycle of 67% is applied to the piezoelectric device portion 92, the displacement U (FIG. 8) of the drive shaft 91 varies as indicated by the waveform shown in FIG. 11B. Consequently, the movable portion 94 moves away from the piezoelectric device portion 92 relative to the drive shaft 91 in the direction Db (FIG. 11C).

Figure 12:
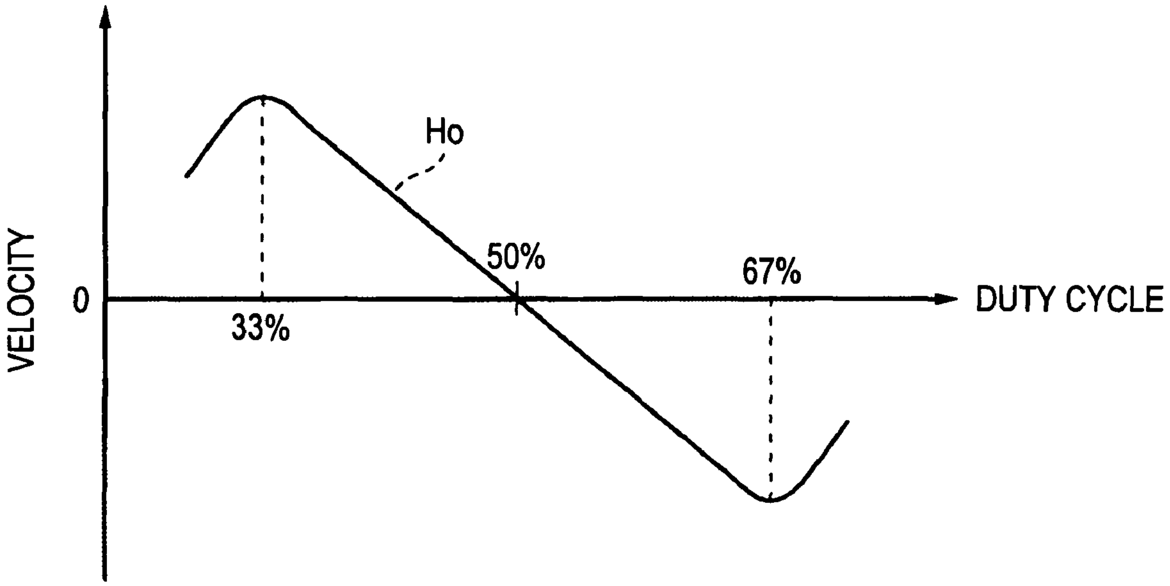
FIG. 12 is a graph showing the relationship between the duty cycle of a pulsed voltage applied to the piezoelectric actuator 9 and the velocity of motion of a movable portion 94.

As described so far, if the pulse sequence applied to the piezoelectric device portion 92 of the piezoelectric actuator 9 is pulse-width modulated to vary the duty cycle, the velocity at which the movable portion 94 moves relative to the drive shaft 91 can be made variable as shown in FIG. 12. On the vertical axis of FIG. 12, it is assumed that the movable portion 94 approaching the piezoelectric device portion 92 in the direction indicated by Da in FIG. 9C has a positive velocity.

Accordingly, the imaging device subunit Uc is driven to slide relative to the swinging pedestal 207 in the left and right direction D (FIG. 7) by applying a voltage to the piezoelectric device portion 2052 of the yaw-direction actuator 205. This corrects the shake of the imaging device 101 in the yaw direction. Shake of the imaging device 101 in the pitch direction is corrected by applying a voltage to the piezoelectric device portion 2062 of the pitch-direction actuator 206 to drive the imaging device subunit Uc so that it slides relative to the slider 202 in the up and down direction C (FIG. 7).

<Functional Configuration of Imaging Apparatus 10A>

Figure 13:
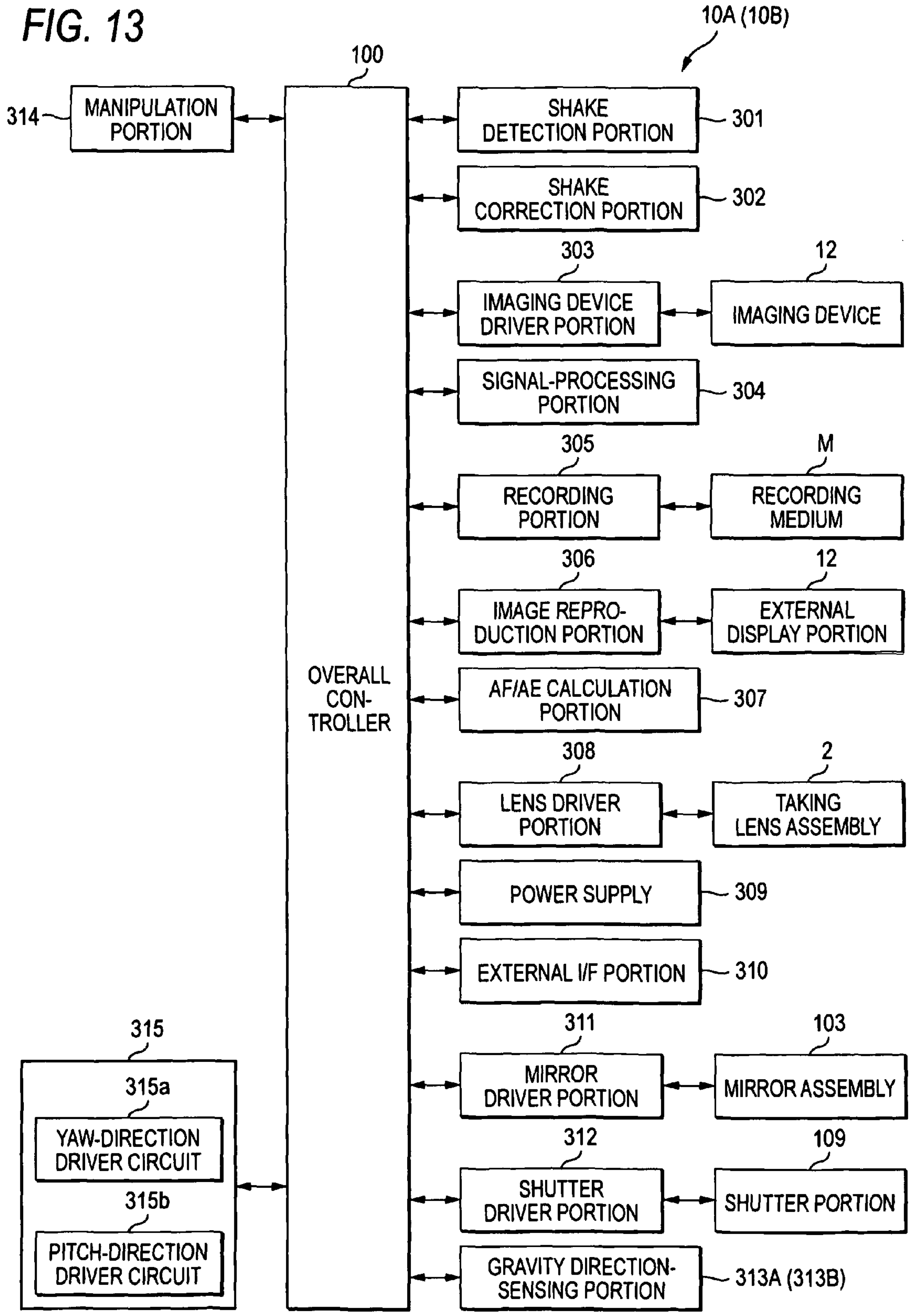
FIG. 13 is a block diagram showing the functional configuration of the imaging apparatus 10A.

FIG. 13 is a block diagram showing the functional configuration of the imaging apparatus 10A. As shown in FIG. 13, the imaging apparatus 10A has the overall controller 100, a shake detection portion 301, a shake correction portion 302, an imaging device driver portion 303, a signal-processing portion 304, a recording portion 305, an image reproduction portion 306, an AF/AE computation portion 307, a lens driver portion 308, a power supply portion 309, an external I/F portion 310, a mirror driver portion 311, a shutter driver portion 312, a gravity direction-sensing portion 313A, a manipulation portion 314, and a driver circuit portion 315. The overall controller 100 includes a ROM (read only memory) for storing control programs, a RAM (random access memory) for temporarily storing data about arithmetic processing and control processing, and a CPU (central processing unit) for reading the control programs from the ROM and executing them. The overall controller receives various signals from the shake detection portion 301, and the manipulation portion 314 or the drive portion, controls the operation of various portions of the imaging apparatus 10A.

The shake detection portion 301 is made of the gyro unit 170 and acts to detect shake of the imaging apparatus 10A caused by a hand movement. The shake correction portion 302 is made of the shake correction unit 200, which makes shake correction by driving the yaw-direction actuator 205 and pitch-direction actuator 206, based on shake information detected by the shake detection portion 301 and on positional information about the imaging device 101, the positional information being detected by the position sensor portion 208.

The imaging device driver portion 303 controls the photoelectric conversion of the imaging device 101 and amplifies, or otherwise performs analog processes on the output signal from the imaging device 101. In particular, a timing generator equipped in the imaging device driver portion 303 outputs a drive control signal to the imaging device 101 to expose the imaging device to the subject light for a given time, thus converting the optical signal into an image signal. The image signal is amplified and then sent to the signal-processing portion 304.

The output image signal from the imaging device 101 is analog and digitally processed in a given manner by the signal-processing portion 304. The signal-processing portion 304 includes an analog signal-processing circuit; an analog-to-digital converter circuit for converting the image signal outputted from the analog signal-processing circuit into an image signal of a digital value; an interpolation circuit for performing pixel interpolation on the digitized pixel data from the analog-to-digital converter circuit; a black level correction circuit for correcting the black level of each pixel data item digitized by the analog-to-digital converter circuit to a reference black level; a white balance (WB) circuit for adjusting the white balance of the image; a gamma (γ) correction circuit for correcting the gray level by correcting the gamma characteristics of pixel data; and an image memory for temporarily storing the image data for which the signal processing has been completed. The analog signal-processing circuit includes a CDS (correlated double sampling) circuit for reducing the sampling noise in the image signal and an AGC (automatic gain control) circuit for adjusting the level of the image signal and performs a predetermined signal processing to the image signal having an analog value output from the imaging device 101.

The recording portion 305 records the created image data onto a removable recording medium M (such as a memory card) and reads out the image data recorded on the recording medium M. The image reproduction portion 306 processes either the image data created by the signal-processing portion 304 or image data read from the recording medium M by the recording portion 305, and create image data adapted for display on the external display portion 12.

The AF/AE computation portion 307 performs calculations for automatic focus control (AF) and automatic exposure control (AE). The lens driver portion 308 controls the operation of the lenses 21 of the lens assembly 2. The lens assembly 2 includes a focus lens, a zoom lens, and an aperture for adjusting the amount of transmitted light. The lens assembly 2 further includes a lens ROM in which information intrinsic to the lenses (such as information about the full F value and the focal distance) is stored. The lens ROM is connected with the overall controller 100 via an electrical contact.

The power supply portion 309 is made of the battery unit 130 and acts to supply an electrical power to various portions of the imaging apparatus 10A. The external I/F portion 310 is made of a connector portion 160 and has AC power jacks and holders for remote terminals and USB terminals. The external I/F portion forms an interface with an external device.

The mirror driver portion 311 drives the mirror assembly 103 including the main mirror 1031 and sub mirror 1032. The mirror driver portion 311 rotates and retracts the main mirror 1031 together with the sub mirror 1032 from the optical axis L of the lens assembly 2, based on a retract signal entered from the overall controller 100. The retract signal is created by the overall controller 100 when an ON signal from the release button 7 is entered into the overall controller 100. When shooting is complete, the mirror driver circuit 311 rotates the retracted mirror assembly 103 back to the original position on the optical axis L. The shutter driver portion 312 drives the shutter portion 109 to open or close it.

The gravity direction-sensing portion 313A detects the direction of gravity (i.e., the direction of free fall) based on the result of detection performed by the posture sensor 135 (FIG. 5). The direction of gravity can be easily detected by the gravity direction-sensing portion 313A by utilizing the posture sensor 135 in this way.

The manipulation portion 314 includes manipulated members, such as the mode-setting dial 6, direction keys 14, and camera shake correction switch 15. Instructions given by user's manipulations are entered through the manipulation portion.

The driver circuit portion 315 has a yaw-direction driver circuit 315*a* and a pitch-direction driver circuit 315*b* for ultrasonically driving the yaw-direction actuator 205 and pitch-direction actuator 206, respectively. For example, the driver circuit portion is mounted on the control substrate 140 (FIG. 6). That is, the yaw-direction actuator 205 is driven by the yaw-direction driver circuit 315*a*. The pitch-direction actuator 206 is driven by the pitch-direction driver circuit 315*b*. Consequently, the imaging device subunit Uc is moved. Thus, shake correction is made for the imaging apparatus 10A.

<Removal of Dust by Low-Pass Filter 108>

The imaging apparatus 10A can perform an operation for removing dust, i.e., shaking off dust adhering to the surface of the low-pass filter 108 of the imaging device subunit Uc by moving the subunit Uc using the yaw-direction actuator 205 or pitch-direction actuator 206 of the shake correction unit 200.

During the operation for removing dust, the imaging device subunit Uc is first moved in a direction substantially identical with the direction of gravity detected by the gravity direction-sensing portion 313A (FIG. 13) to cause the bearing portions 2022 and 2023 to collide against the stoppers Sa-Sd. The impact that the imaging device subunit Uc undergoes from the collision permits effective removal of dust. The dust removal can be hastened. Furthermore, the durability of the drive mechanism Mv can be improved.

For example, where the posture sensor 135 can detect four directions (i.e., up, down, left, and right) of the imaging apparatus 10A relative to the direction of gravity, one actuator for driving the imaging device subunit Uc in the detected direction of gravity is selected from the yaw-direction actuator 205 and pitch-direction actuator 206. The selected one actuator is driven, for example, with a duty cycle of 33% or 67% to move the imaging device subunit Uc at high speed in the direction of gravity to bring one bearing portion (bearing portion 2022 or 2023) into collision with one of the four stoppers Sa-Sd.

In particular, a direction of motion (one of the four directions including the upward, downward, leftward, and rightward directions) is set based on the direction of gravity detected by the posture sensor 135 regarding motion of the imaging device subunit Uc. One actuator used for movement of the imaging device subunit Uc in the set direction of motion is selected from the yaw-direction actuator 205 and the pitch-direction actuator 206. The selected actuator is driven to move the imaging device subunit Uc in the direction of gravity, bringing the bearing portion into collision with the stoppers. Consequently, the dust adhering to the low-pass filter 108 of the imaging device subunit Uc can be removed efficiently and quickly.

After the imaging device subunit Uc is moved in the direction of gravity and the bearing portion is brought into collision with the stoppers, the selected actuator is preferably driven to vibrate the imaging device holder 201 along the vertical direction for a given time. This vibration time can be made shorter than heretofore because most of the dust adhering to the low-pass filter 108 has been shaken off because of the collision with the stoppers. When the imaging device holder 201 is vibrated in this way and is driven in the direction of gravity, it is better to bring the bearing portion into collision with stoppers. If plural collisions with the stoppers take place in this way, dust can be shaken off with greater certainty.

In the operation for removing dust as described so far, it is not essential to bring the bearing portions 2022 and 2023 into collision with stoppers. The imaging device holder 201 may be vertically reciprocated (vibrated) without bringing the holder into collision with any stopper. Also, in this case, dust can be shaken off more efficiently than heretofore.

On the other hand, the imaging apparatus 10A can perform an operation for removing dust by vibrating the low-pass filter 108 by the ultrasonically driven actuator to effectively shake off dust adhering to the low-pass filter 108 that is a light-transmitting member. This is described in further detail in the following.

Figure 14B:
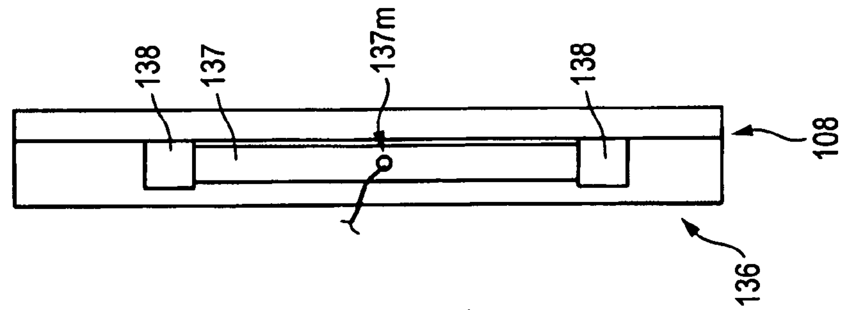
FIGS. 14A to 14C illustrate an actuator 136 for vibrating a low-pass filter 108.
Figure 14A:
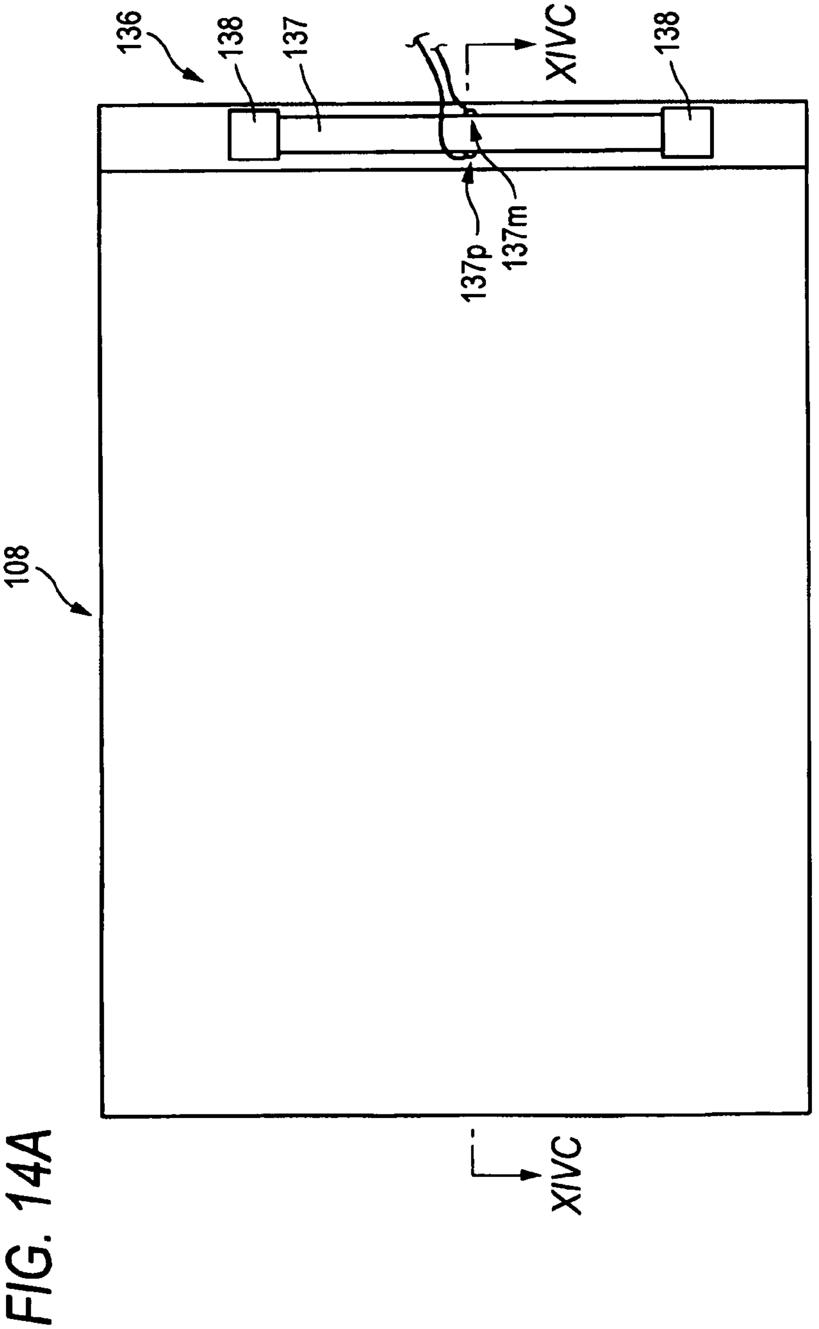
Figure 14C:
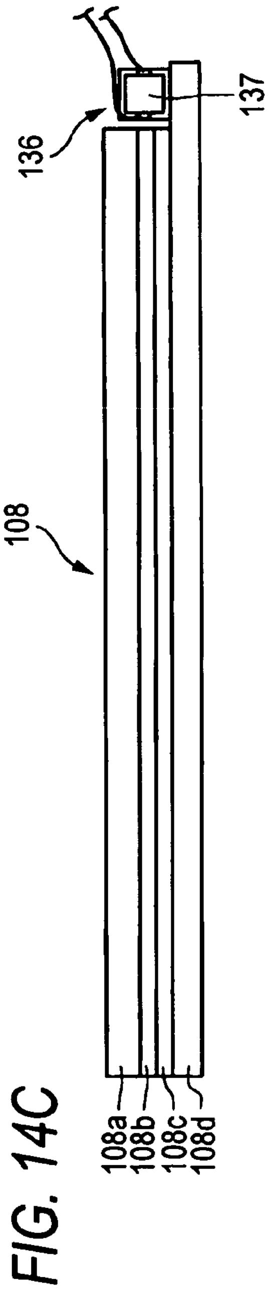
Figure 15:
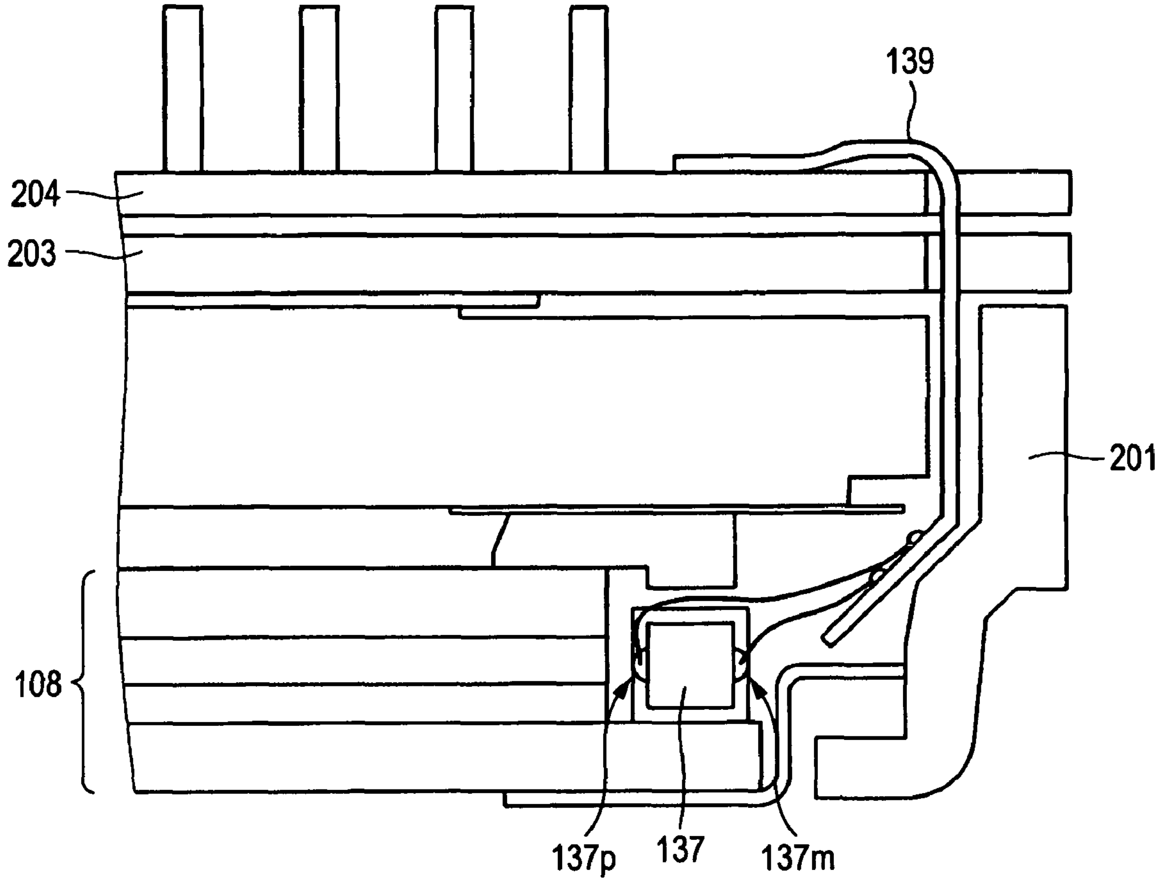
FIG. 15 is a view illustrating a flexible printed wiring board 139 extending from an image device substrate 204.

FIGS. 14A-14C illustrates the actuator 136 for vibrating the low-pass filter 108. FIG. 15 is an enlarged view of a portion located around the broken line ER shown in FIG. 5. FIG. 14A is a plan view of the low-pass filter 108. FIG. 14B is a right side elevation of the low-pass filter 108 shown in FIG. 14A. FIG. 14C is a cross-sectional view taken along the line Q-Q of FIG. 14A.

As shown in FIG. 14C, the low-pass filter 108 is a lamination of four members 108*a*-108*d* each, assuming the form of a rectangular flat plate. The member 108*d* in the lowest layer is larger in area than the members 108*a*-108*c* in the other three layers. The actuator 136 (hereinafter may be referred to as the actuator for vibration of the filter or filter-vibrating actuator) for ultrasonically vibrating the low-pass filter 108 is disposed over the member 108*d*.

The actuator 136 has a piezoelectric device portion 137 and two holding members 138 for holding the opposite ends of the piezoelectric device portion 137 to the low-pass filter 108.

The piezoelectric device portion 137 has a positive electrode 137*p* and a negative electrode 137*m*. When a pulsed voltage is applied between the electrodes, the piezoelectric device portion 137 longitudinally elongates and contracts. Consequently, the low-pass filter 108 can be vibrated. Electric power is supplied to the piezoelectric device portion 137 via a flexible printed wiring board 139 extending from the imaging device substrate 204 as shown in FIGS. 15 and 16.

Figure 16:
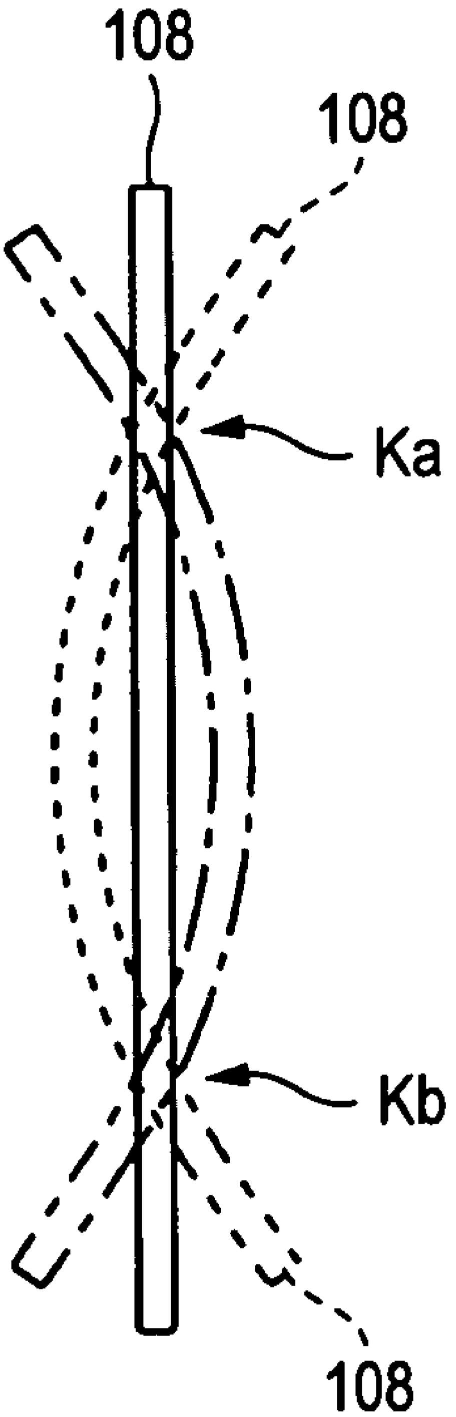
FIG. 16 is a view illustrating resonant oscillation of the low-pass filter 108.

In the actuator, 316 constructed as described so far, when a pulsed voltage in an ultrasonic region (where the low-pass filter 108 itself resonates) is applied to the piezoelectric device portion 137, the filter 108 is bent perpendicularly to the direction of elongation and contraction (longitudinal direction) of the piezoelectric device portion 137, for example, as shown in FIG. 16, in other words, in the direction of thickness of the filter 108. A vibrational mode having two vibrational nodes Ka and Kb appears. The low-pass filter 108 is ultrasonically vibrated at its resonant frequency because the actuator 316 is driven as mentioned previously. In consequence, dust adhering to the filter 108 can be efficiently shaken off.

The circuit for driving the actuator 316 is described in the following.

Figure 17:
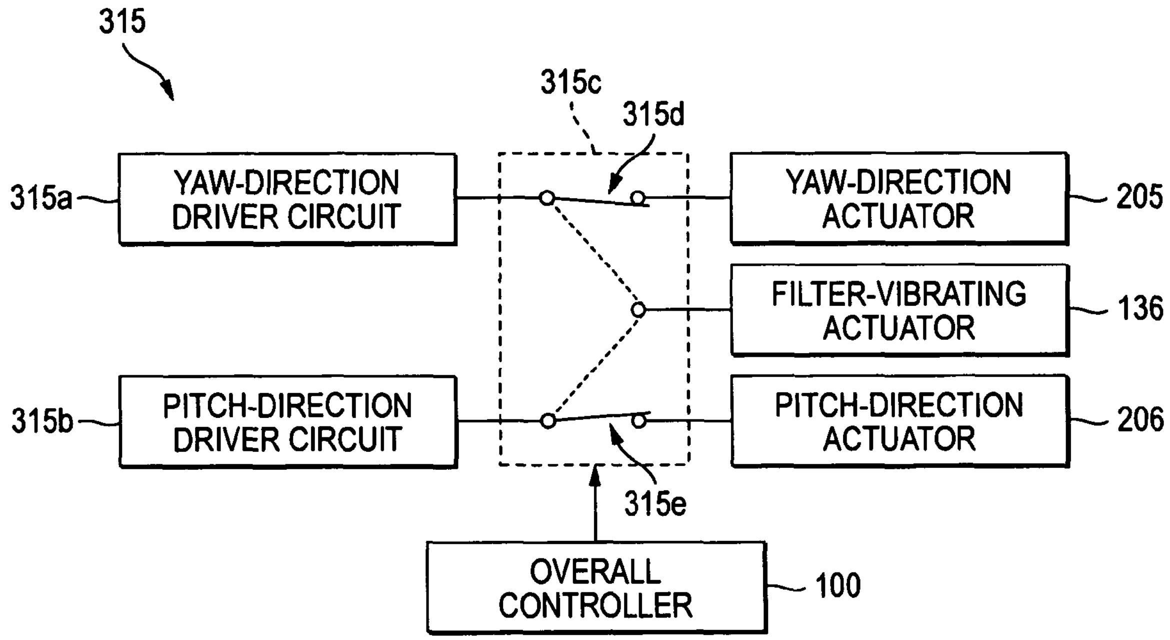
FIG. 17 is a block diagram illustrating a circuit for driving an actuator 136 that vibrates the filter.

FIG. 17 is a block diagram illustrating the driver circuit for driving the actuator 136 for vibrating the filter.

The driver circuit portion 315 (FIG. 13) has a switching portion 315*c*, as well as the aforementioned yaw-direction driver circuit 315*a* and pitch-direction driver circuit 315*b*. The switching portion 315*c* has two switches 315*d* and 315*e*.

The switch 315*d* of the switching portion 315*c* switches the electrical connection of the yaw-direction driver circuit 315*a* between the yaw-direction actuator 205 and filter-vibrating actuator 136 according to instructions from the overall controller 100. When the yaw-direction driver circuit 315*a* is used to remove dust by ultrasonic vibration of the low-pass filter 108, the switch 315*d* can connect the yaw-direction driver circuit 315*a* with the filter-vibrating actuator 136.

The switch 315*e* of the switching portion 315*c* switches the electrical connection of the pitch-direction driver circuit 315*b* between the pitch-direction actuator 206 and filter-vibrating actuator 136 according to instructions from the overall controller 100. When the pitch-direction driver circuit 315*b* is used to remove dust by ultrasonic vibration of the low-pass filter 108, the switch 315*e* can connect the pitch-direction driver circuit 315*b* with the filter-vibrating actuator 136.

The imaging apparatus 10A equipped with the switching portion 315*c* constructed as described so far can perform the operation for removing dust using the actuator of the shake correction unit 200 employing one of the yaw-direction driver circuit 315*a* and pitch-direction driver circuit 315*b* and, concurrently, the operation for removing dust using the filter-vibrating actuator 136 employing the other.

In particular, when one actuator selected according to the direction of gravity detected by the gravity direction-sensing portion 313A is the yaw-direction actuator 205, the yaw-direction actuator 205 is ultrasonically driven by the yaw-direction driver circuit 315*a* to move the imaging device subunit Uc in a direction of motion based on the direction of gravity, bringing the subunit into collision with the stoppers Sa-Sd. Thus, the operation for removing dust is performed. The filter-vibrating actuator 136 is ultrasonically driven by applying a voltage from the pitch-direction driver circuit 315*b*. Consequently, the low-pass filter 108 is resonantly vibrated, thus removing dust.

On the other hand, when one actuator selected according to the direction of gravity detected by the gravity direction-sensing portion 313A is the pitch-direction actuator 206, this actuator 206 is ultrasonically driven by the pitch-direction driver circuit 315*b* to move the imaging device holder 201 in the direction of motion based on the direction of gravity, bringing the holder into collision with the stoppers Sa-Sd. Thus, dust is removed. Furthermore, the filter-vibrating actuator 136 is ultrasonically driven by the yaw-direction driver circuit 315*a* to resonantly vibrate the low-pass filter 108. Thus, dust is removed.

When dust is removed by ultrasonic vibration of the low-pass filter 108, the connection of the yaw-direction driver circuit 315*a* with the yaw-direction actuator 205 or the connection of the pitch-direction driver circuit 315*b* with the pitch-direction actuator 206 is switched to connection with the filter-vibrating actuator 136 by the switching portion 315*c*. Consequently, the switching can be done with good timing of the driver circuits. When the connection is switched in this way, the frequency of a drive signal (e.g., a signal of a pulsed voltage) created by a driver circuit is switched to the resonant frequency of the low-pass filter 108.

In the imaging apparatus 10A described so far, when dust adhering to the low-pass filter 108 is shaken off to remove the dust, the filter 108 is ultrasonically vibrated by driving the filter-vibrating actuator 136, using the yaw-direction driver circuit 315*a* or pitch-direction driver circuit 315*b*. Therefore, a dedicated driver circuit for driving the filter-vibrating actuator 136 is dispensed with. Dust adhering to the low-pass filter 108 can be removed effectively at low cost.

In the imaging apparatus 10A, dust removal using the shake correction unit 200 and dust removal using the filter-vibrating actuator 136 are performed at the same time, using the two driver circuits, i.e., yaw-direction driver circuit 315*a* and pitch-direction driver circuit 315*b*. Consequently, the two operations for removing dust produce a combined effect, permitting more effective removal of dust. Hence, the dust removal can be hastened.

Second Embodiment

An imaging apparatus 10B associated with a second embodiment of the present invention is similar in structure with the imaging apparatus 10A according to the first embodiment described already in connection with FIGS. 1-6 except for the structure of the gravity detection-sensing portion.

Specifically, the gravity direction-sensing portion 313B of the imaging apparatus 10B is configured to detect the direction of gravity, based on information about the velocity at which the imaging device subunit Uc is moved. Detection of the direction of gravity by the gravity direction-sensing portion 313B is described in the following.

<Detection of the Direction of Gravity by the Gravity Direction-Sensing Portion 313B>

FIGS. 18A-18C and 19 illustrate the principle on which the direction of gravity is detected by the gravity direction-sensing portion 313B. In each of FIGS. 18A-18C, a piezoelectric actuator 9 similar in structure with the actuator shown in FIG. 8 is shown. The drive shaft 91 is in a posture where the shaft extends in the vertical direction. A characteristic curve Ho indicated by the broken line in FIG. 19 corresponds to characteristics associated with the duty cycle and velocity shown in FIG. 12.

Figure 18A:
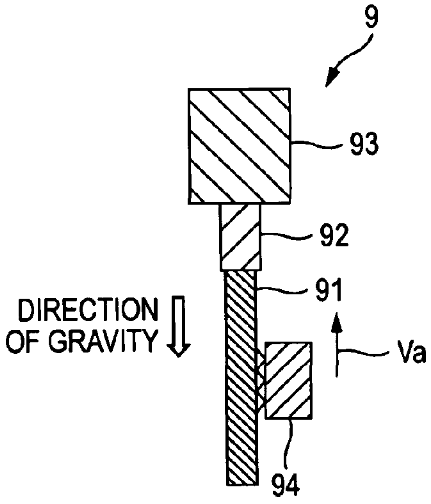
FIGS. 18A to 18C illustrate the principle on which a gravity direction-sensing portion 313B of an imaging apparatus 10B associated with a second embodiment of the present invention detects the direction of gravity.

When the piezoelectric actuator 9 is in a posture as shown in FIG. 18A, a voltage of a pulse sequence with a duty cycle of 33% (see FIG. 9A) is applied to the piezoelectric device portion 92 to move the movable portion 94 in a direction opposite to the direction of gravity. In this case, the movable portion 94 undergoes an attractive force acting in the direction of gravity and so the drive shaft 91 moves at a lower velocity Va than when the drive shaft 91 is disposed horizontally and moved horizontally.

Figure 18B:
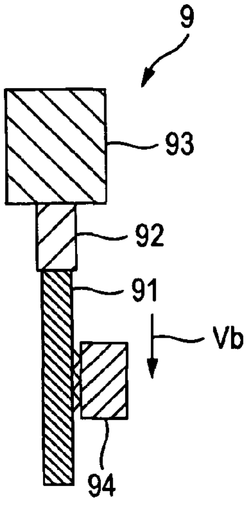

When the piezoelectric actuator 9 is in a posture as shown in FIG. 18B, a voltage of a pulse sequence with a duty cycle of 50% (see FIG. 10A) is applied to the piezoelectric device portion 92. In this case, the frictional coupling between the drive shaft 91 and the movable portion 94 is owed to a dynamic frictional force. Therefore, the movable portion 94 is moved in the direction of gravity at a velocity Vb by an attractive force.

Figure 18C:
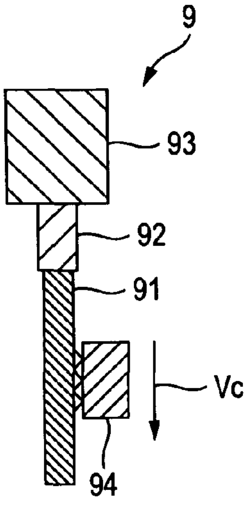
Figure 19:
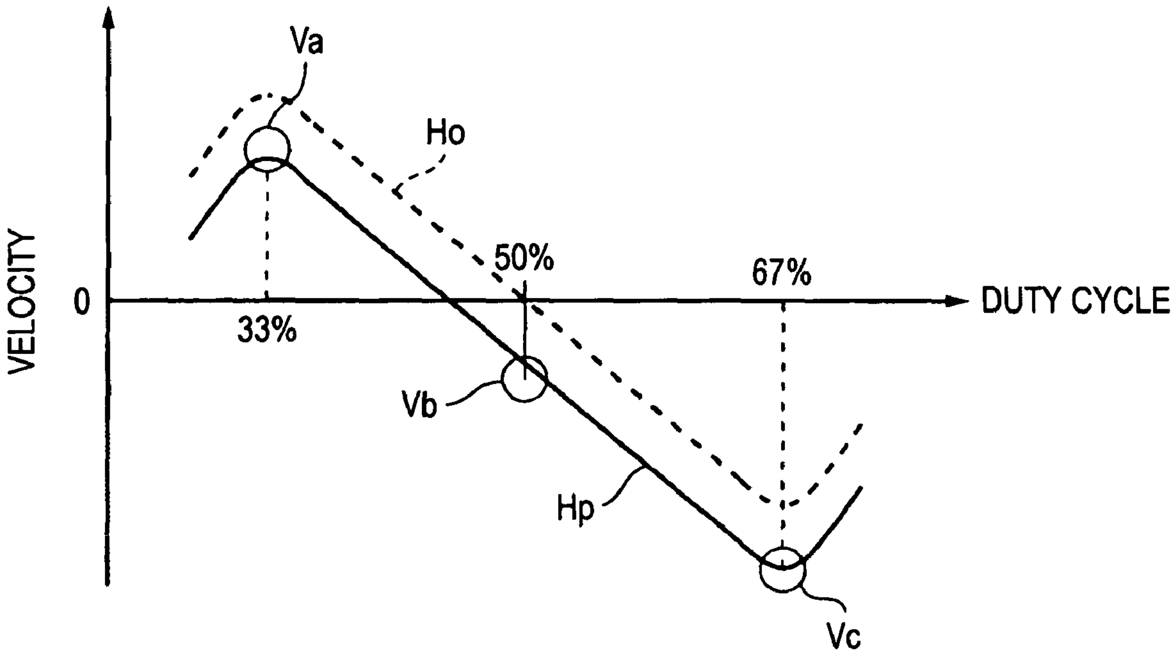
FIG. 19 is a graph illustrating the principle on which the direction of gravity is detected by the gravity direction-sensing portion 313B.

Meanwhile, when the piezoelectric actuator 9 is in a posture as shown in FIG. 18C, a voltage of a pulse sequence with a duty cycle of 67% (see FIG. 11A) is applied to the piezoelectric device portion 92 to move the movable portion 94 in the direction of gravity. In this case, the movable portion 94 undergoes an attractive force acting in the direction of gravity. Therefore, the movable portion 94 moves at a velocity Vc higher than when the movable portion is moved horizontally.

When the drive shaft 91 of the piezoelectric actuator 9 is disposed in the vertical direction, the movable portion 94 moves at the velocities Va-Vc (FIGS. 18A-18C) as described so far. The velocities Va-Vc are plotted in the graph of FIG. 19, where a velocity characteristic curve Hp indicated by the solid line is obtained. The velocity characteristic curve Hp in the vertical direction has been shifted with respect to the velocity characteristic curve Ho in the horizontal direction.

This means that if the velocity of the movable portion 94 is observed when the piezoelectric actuator 9 is driven, then the direction of gravity can be detected. The motion velocity of the imaging device subunit Uc corresponding to the movable portion 94 is detected by differentiating the position detected by the position sensor portion 208 with respect to time, e.g., by measuring a minute distance traveled in a quite short time (e.g., 50 ms).

The direction of gravity is detected by the gravity direction-sensing portion 313B using the principle of detection as described so far. Its specific examples of method (i) and (ii) are described in the following.

(i) Detection of Direction of Gravity Utilizing Small Stroke Operation

When the drive shaft 91 is disposed horizontally, pulsed voltages, with duty cycles (complementary duty cycles) at which the velocity of the movable portion 94 is substantially uniform between its going and returning paths, are applied to the piezoelectric device portion 92 to reciprocate the movable portion 94 with a small stroke (e.g., about 0.3 to 0.5 mm). The velocities of the movable portion 94 in the going and returning paths, respectively, are detected. When the velocity is different between the going and returning paths, the direction resulting in a greater absolute value of velocity is judged to be the direction of gravity.

It is assumed, for example, that the movable portion 94 is moved at a velocity $v_+$ by applying a pulsed voltage with a duty cycle of 33% when the movable portion is driven in the going path and that the movable portion 94 is moved at a velocity v by applying a pulsed voltage with a duty cycle of 67% when the movable portion is driven in the returning path. When $|v_+|>|v\_|$, the direction of motion in the going path is the direction of gravity. When $|v_+|<|v\_|$, the direction of motion in the returning path is the direction of gravity.

The method of detecting the direction of gravity as described so far is applied to the imaging apparatus 10B of the present embodiment equipped with the yaw-direction actuator 205 and pitch-direction actuator 206 having shaft portions 2051 and 2061, which correspond to the drive shaft 91 and are perpendicular to each other. In this case, the imaging apparatus operates as follows.

With respect to the velocity at which the bearing portion 2023 moves relative to the shaft portion of 2051 disposed along the X-direction in the yaw-direction in the yaw-direction actuator 205, let $v_{X+}$ be the velocity in the +X-direction when the movable portion is driven, for example, with a duty cycle of 33%. Let $v_{X-}$ be the velocity in the −X-direction when the movable portion is driven, for example, with a duty cycle of 67%. The difference between their absolute values is given by $$\Delta v_X = |v_{X+}| - |v_{X-}| \quad (1)$$

Meanwhile, with respect to the velocity at which the bearing portion 2022 moves relative to the shaft portion 2061 disposed along the Y-direction in the pitch-direction actuator 206, let $v_{Y+}$ be the velocity in the +Y-direction when the movable portion is driven, for example, with a duty cycle of 33%. Let $v_{Y-}$ be the velocity in the −Y-direction when the movable portion is driven, for example, with a duty cycle of 67%. The difference between their absolute values is given by $$\Delta v_Y = |v_{Y+}| - |v_{Y-}| \quad (2)$$

The angle θ that the direction of gravity forms with the X-axis (see FIG. 1) of the imaging apparatus 10B is next calculated from $\Delta v_X$ and $\Delta v_Y$ obtained from Eqs. (1) and (2) above, using the following Eq. (3).

$$\theta = \tan^{-1}\frac{\Delta v_Y}{\Delta v_X} \quad (3)$$

Dust can be removed efficiently by moving the imaging device subunit Uc in the direction of the angle θ obtained from Eq. (3), i.e., in the direction of motion corresponding to the direction of gravity, using at least one of the yaw-direction actuator 205 and pitch-direction actuator 206.

That is, it is assumed that a vector representing the direction of gravity is resolved into a first vector component parallel to the X-direction (left and right direction D in FIG. 7) of the imaging apparatus 10B and a second vector component parallel to the Y-direction (up and down direction C in FIG. 7). Voltages, for example, with duty cycles of 33% and 67%, respectively, which make substantially uniform the velocity of motion between the going and returning paths taken when the imaging device subunit Uc is reciprocated horizontally are applied to the pitch-direction actuator 206 and yaw-direction actuator 205, respectively, to drive them. The velocities of motion of the imaging device subunit Uc in the going and returning paths in the left and right direction D, and in the up and down direction C are then detected. When the motion velocity in the left and right direction D is larger in the going path than in the returning path, the first vector component is judged to be directed in the direction of the going path. On the other hand, when the motion velocity is larger in the returning path than in the going path, the first vector component is judged to be directed in the direction of the returning path. When the motion velocity in the up and down direction C is larger in the going path than in the returning path, the second vector component is judged to be directed in the direction of the going path. Meanwhile, when the velocity in the returning path is larger than in the going path, the second vector component is judged to be directed in the direction of the returning path.

The method of detection described so far permits an appropriate direction of gravity to be detected easily. The angle θ obtained from Eq. (3) above, i.e., the method of driving the pitch-direction actuator 206 and yaw-direction actuator 205 to remove dust according to the detected direction of gravity, will be described in the following.

Figure 20:
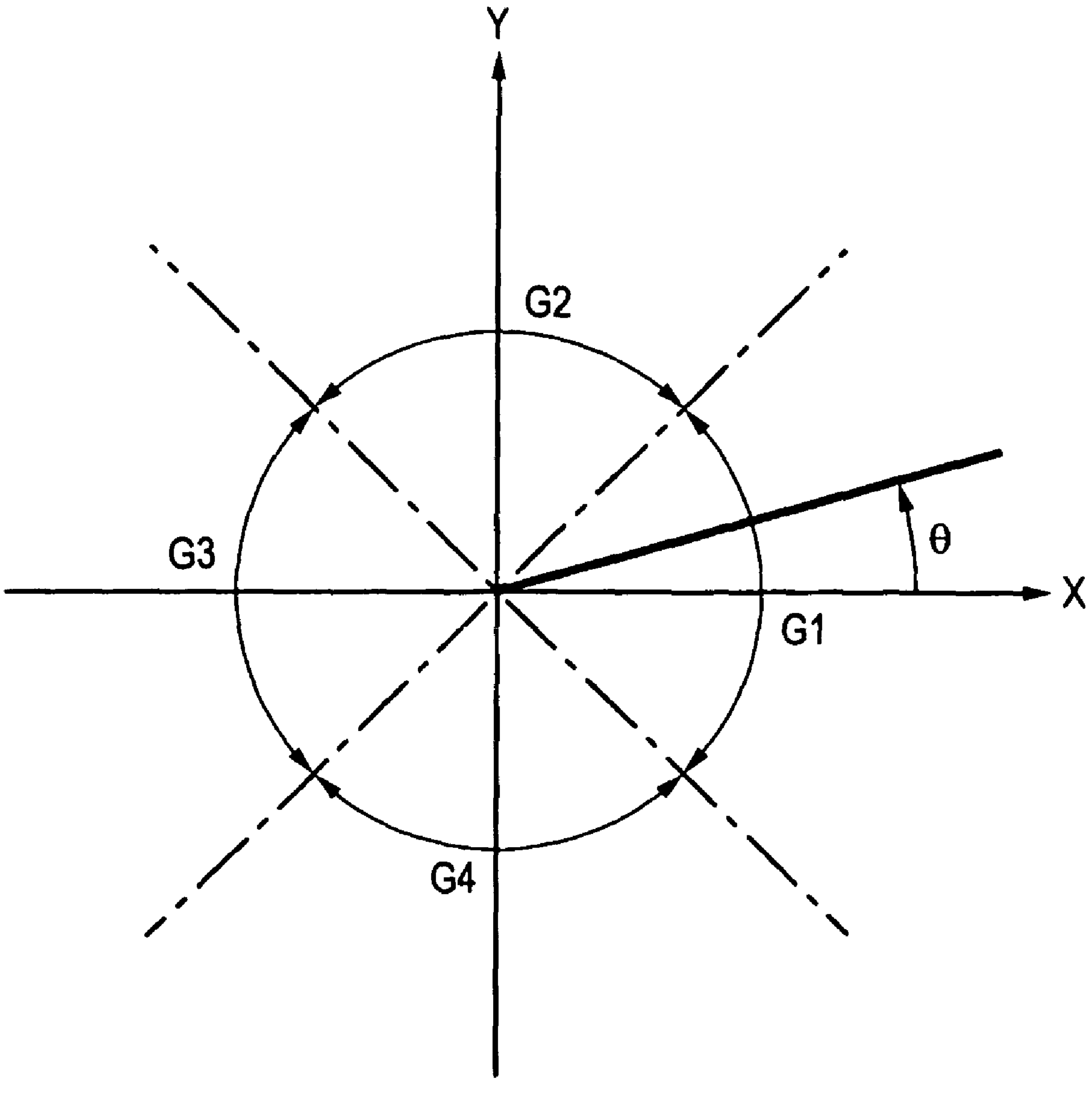
FIG. 20 is a diagram illustrating the manner in which a pitch-direction actuator 206 and a yaw-direction actuator 205 are driven when dust is removed.

FIG. 20 is a graph illustrating a method of driving the pitch-direction actuator 206 and yaw-direction actuator 205 when dust is removed. In the graph of FIG. 20, the horizontal axis indicates the direction of the X-axis (see FIG. 1) of the imaging apparatus 10B. The vertical axis indicates the direction of the Y-axis (see FIG. 1) of the imaging apparatus 10B.

The yaw-direction actuator 205 is selected and driven in the +X-direction. Where the angle θ falls within the range G3 (135°<θ≦225°), the yaw-direction actuator 205 is also selected and driven in the −X-direction.

Meanwhile, when the angle θ calculated using Eq. (3) above falls within the range G2 (45°<θ≦135°), the actuator 206 is selected and driven in the +Y-direction. Furthermore, when the angle θ falls within the range G4 (225°<θ≦315°), the pitch-direction actuator 206 is selected and driven in the −X-direction.

Because the imaging device subunit Uc can be moved in a direction substantially equal to the direction of gravity by driving the yaw-direction actuator 205 or pitch-direction actuator 206 in this way, dust can be removed efficiently using the shake correction unit 200.

(ii) Detection of Direction of Gravity Using Operation with Duty Cycle of 50%

A pulsed voltage with a duty cycle of 50% of the movable portion 94 is not moved horizontally is applied to the piezoelectric actuator 9, and the velocity of the movable portion 94 is detected. Where the velocity of the movable portion 94 is detected, the direction of the velocity is judged to be the direction of gravity. The method of detecting the direction of gravity as described so far is applied to the imaging apparatus 10B of the present embodiment as follows.

Let $v_X$ be the velocity of the bearing portion 2023 relative to the shaft portion 2051 of the yaw-direction actuator 205. Let $v_Y$ be the velocity of the bearing portion 2022 relative to the shaft portion 2061 of the pitch-direction actuator 206. The angle θ that the direction of gravity forms with the X-axis (see FIG. 1) of the imaging apparatus 10B is calculated as given by the following Eq. (4).

$$\theta = \tan^{-1}\frac{v_Y}{v_X} \tag{4}$$

One actuator is selected according to the direction of the angle θ obtained using Eq. (4) in the same way as in (i), i.e., according to the direction of gravity, and driven. Thus, dust can be removed efficiently.

That is, if a vector representing the direction of gravity is resolved into a first vector component parallel to the X-direction (left and right direction D in FIG. 7) of the imaging apparatus 10B and a second vector component parallel to the Y-direction (up and down direction C in FIG. 7), a certain pulse sequence, for example, with a duty cycle of 50% as described above, which does not move the imaging device subunit Uc in the horizontal direction, is applied to the yaw-direction actuator 205 and the pitch-direction actuator 206, and the velocities at which the subunit Uc moves in the left and right direction D and up and down direction C are detected. When the velocity of motion of the imaging device subunit Uc is detected in the left and right direction D, the first vector component is judged to lie in the direction of motion velocity. Where the velocity of motion of the subunit Uc is detected in the up and down direction C, the second vector component is judged to lie in the direction of the motion velocity.

The method of detection described so far permits an appropriate direction of gravity to be detected easily. Dust can be removed efficiently using the shake correction unit 200 by moving the imaging device subunit Uc in the direction of motion corresponding to the detected direction of gravity.

The operation of the imaging apparatus 10B to remove dust as described so far yields the same advantages as the operation of the imaging apparatus 10A. Furthermore, the imaging apparatus 10B detects the direction of gravity by utilizing the characteristics of the yaw-direction actuator 205 and pitch-direction actuator 206 by means of the gravity direction-sensing portion 313B and, therefore, the posture sensor 135 for detection of the gravity detection is dispensed with.

Modified Embodiment

In the above-described embodiments, it is not essential that the low-pass filter 108 be ultrasonically vibrated during dust removal. A dedicated glass member made of a light-transmitting member mounted together with or instead of the low-pass filter 108 in the imaging device subunit Uc may be ultrasonically vibrated.

It should be understood by those skilled in the art that various modifications, combinations, subcombinations and alterations may occur depending on design requirements and other factors insofar as they are within the scope of the appended claims or the equivalents thereof.

What is claimed is:

1. An imaging apparatus comprising:

(a) an imaging device subunit having an imaging device for creating an image signal associated with a subject and a light-transmitting member mounted ahead of a photosensitive surface of the imaging device;

(b) a first driver circuit for driving a first actuator that moves the imaging device subunit in a first direction;

(c) a second driver circuit for driving a second actuator that moves the imaging device subunit in a second direction substantially perpendicular to the first direction; and (d) first dust-removing means for shaking off dust adhering to the light-transmitting member by driving a given actuator so as to vibrate the light-transmitting member;

wherein the given actuator is driven using the first driver circuit or the second driver circuit.

2. An imaging apparatus as set forth in claim 1, wherein when dust is removed by the first dust-removing means, the given actuator is driven by causing connection of the first driver circuit with the first actuator or connection of the second driver circuit with the second actuator to be switched to connection with the given actuator.

3. An imaging apparatus as set forth in claim 1, wherein a shake correction associated with the imaging apparatus is made by moving the imaging device subunit by driving the first and second actuators by the first and second driver circuits, respectively.

4. An imaging apparatus as set forth in claim 1, further comprising:

(e) second dust-moving means for shaking off dust adhering to the light-transmitting member by moving the imaging device subunit by the first actuator or the second actuator;

(f) control means for causing dust removal by the first dust-removing means and dust removal by the second dust-removing means to be executed concurrently; and wherein the control means has:

(f-1) first control means for selecting one actuator from the first and second actuators and driving the selected one actuator to cause the second dust-removing means to remove dust; and (f-2) second control means which, when the selected one actuator is the first actuator, drives the given actuator using the second driver circuit to cause the first dust-removing means to remove dust and which, when the selected one actuator is the second actuator, drives the given actuator using the first driver circuit to cause the first dust-removing means to remove dust.

5. An imaging apparatus as set forth in claim 4, wherein there is further provided (g) sensing means for detecting the direction of gravity, and wherein the first control means causes the second dust-removing means to remove dust by selecting the one actuator according to the detected direction of gravity and driving the selected one actuator to move the imaging device subunit in a direction of motion based on the direction of gravity.

6. An imaging apparatus as set forth in claim 5, wherein movement of the imaging device subunit in at least one of the first and second directions is limited by given stoppers, and wherein the first control means causes the second dust-removing means to remove dust by driving the selected one actuator to move the imaging device subunit in the direction of motion and to bring the subunit into collision with the given stoppers.

* * * * *